US008264551B2

(12) United States Patent
Kurata et al.

(10) Patent No.: US 8,264,551 B2
(45) Date of Patent: Sep. 11, 2012

(54) METHODS FOR CORRECTING DISTORTIONS OF IMAGE-TAKING VIDEO SIGNALS AND APPARATUS FOR CORRECTING DISTORTIONS OF IMAGE-TAKING VIDEO SIGNALS

(75) Inventors: Tohru Kurata, Saitama (JP); Manabu Kubo, Tokyo (JP); Kimitaka Wada, Kanagawa (JP); Toshiyuki Kaimi, Tokyo (JP)

(73) Assignee: Sony Corporation, Tokyo (JP)

( * ) Notice: Subject to any disclaimer, the term of this patent is extended or adjusted under 35 U.S.C. 154(b) by 1359 days.

(21) Appl. No.: 11/317,845

(22) Filed: Dec. 22, 2005

(65) Prior Publication Data
US 2006/0140603 A1    Jun. 29, 2006

(30) Foreign Application Priority Data
Dec. 28, 2004    (JP) ................. P2004-380683

(51) Int. Cl.
*H04N 5/228*    (2006.01)
(52) U.S. Cl. ............... 348/208.4; 348/208.1; 348/208.2; 348/208.3; 348/208.5; 348/208.6
(58) Field of Classification Search .......... 348/208.99, 348/208.1–208.6
See application file for complete search history.

(56) References Cited

U.S. PATENT DOCUMENTS
5,905,848 A *    5/1999    Yano et al. ............... 386/117
2005/0179784 A1 *    8/2005    Qi ........................... 348/208.1
2006/0170784 A1 *    8/2006    Clarke et al. ............. 348/208.99

FOREIGN PATENT DOCUMENTS
| JP | 5316404 | 11/1993 |
| JP | 06-343159 | 12/1994 |
| JP | 2001358999 | * 12/2001 |
| JP | 3384459 | 3/2003 |
| JP | WO2004/066619 | * 8/2004 |
| JP | 2004 266322 | 9/2004 |
| JP | 2004-266322 | 9/2004 |
| JP | 2004-363857 | 12/2004 |

* cited by examiner

*Primary Examiner* — Jason Chan
*Assistant Examiner* — Joel Fosselman
(74) *Attorney, Agent, or Firm* — K&L Gates LLP

(57) ABSTRACT

A method and an apparatus for correcting distortions of image-taking video signals are provided. The method and an apparatus adopting the method are capable of reducing distortion generated in a taken image by correction of inter-frame and intra-frame hand movements in an image-taking apparatus employing an image-taking device of an X-Y address type. To be more specific, this method is capable of correcting distortion observed in a taken image as distortion caused by a positional change, which occurs in the horizontal and/or vertical directions of the taken image at a photographing time as a positional change of the image-taking device. In accordance with the method, in a frame period of a taken image, an inter-frame correction quantity for a positional change of the device is detected and, on the basis of the detected inter-frame correction quantity, the positional change is corrected to eliminate a displacement observed when the frame changes to the next one as a displacement of the taken image. An intra-frame correction quantity for a positional change of the image-taking device is computed for each of many locations on the screen of the taken image and, on the basis of the computed intra-frame correction quantity, distortions caused by positional changes on the screen of the taken image as distortions of the taken image are corrected.

16 Claims, 22 Drawing Sheets

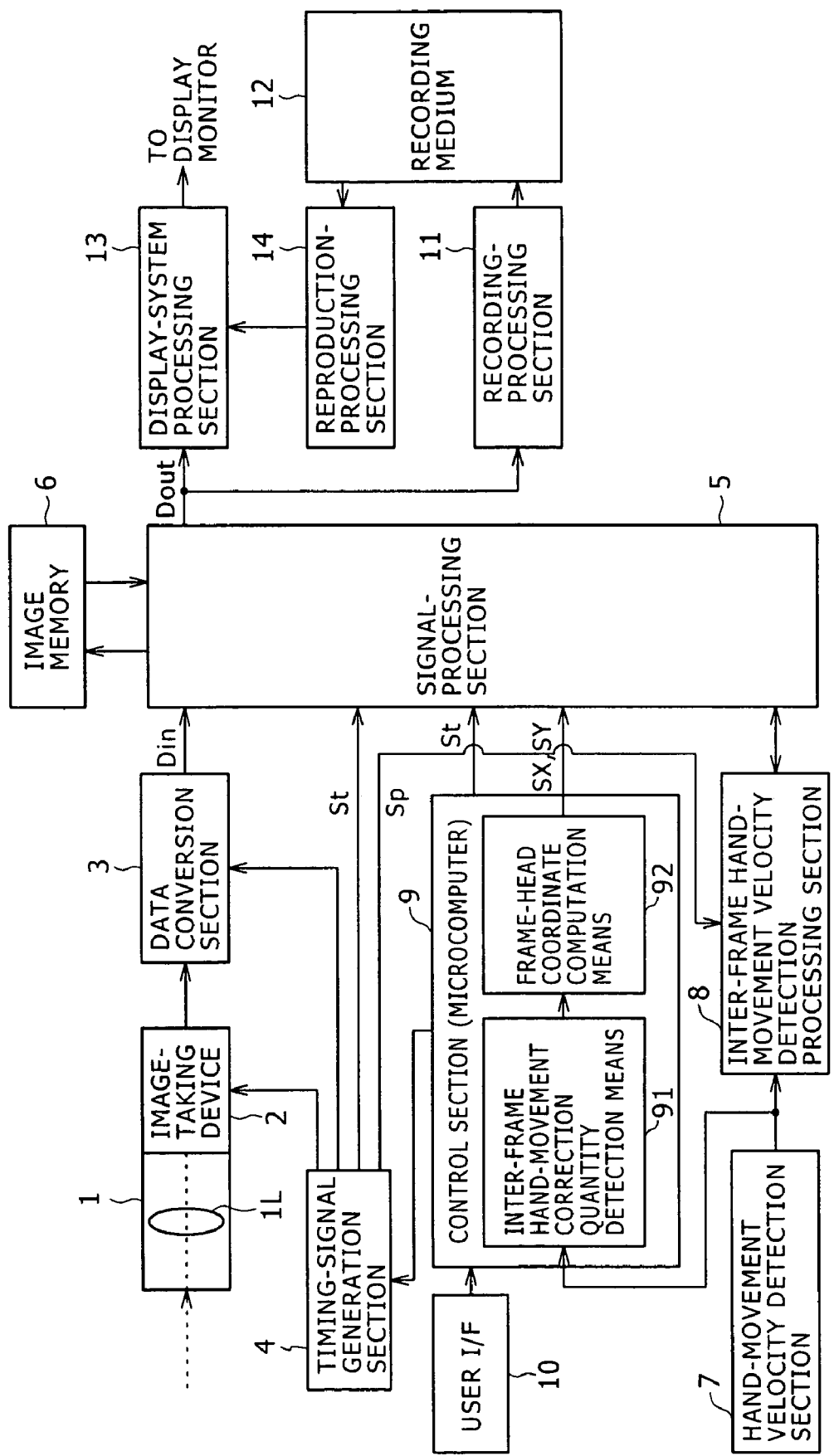
F I G . 4

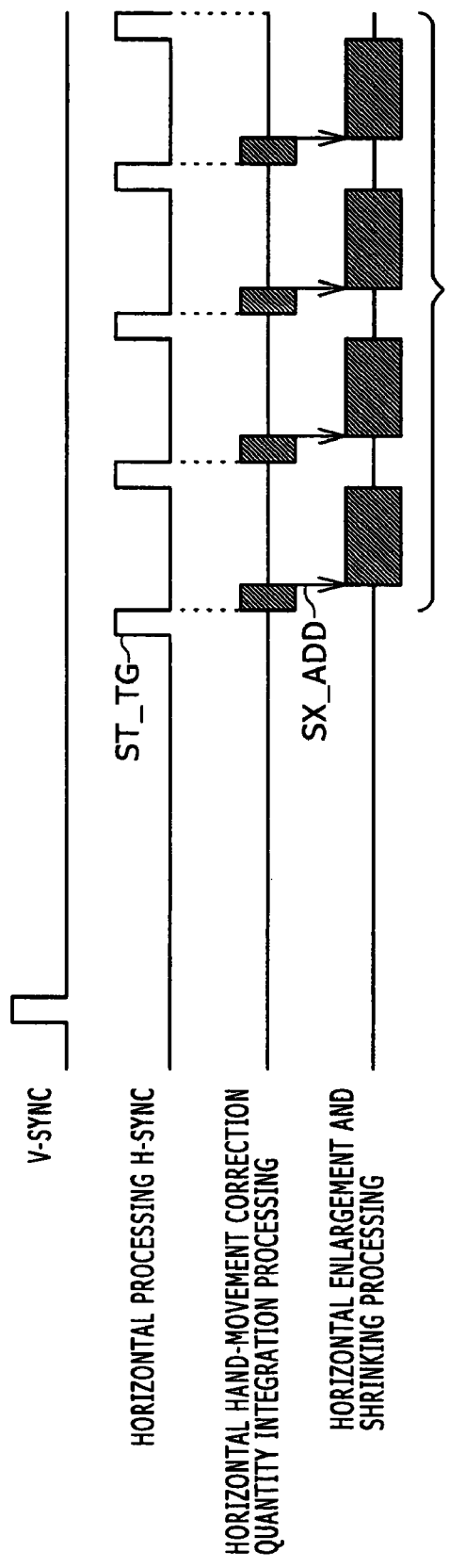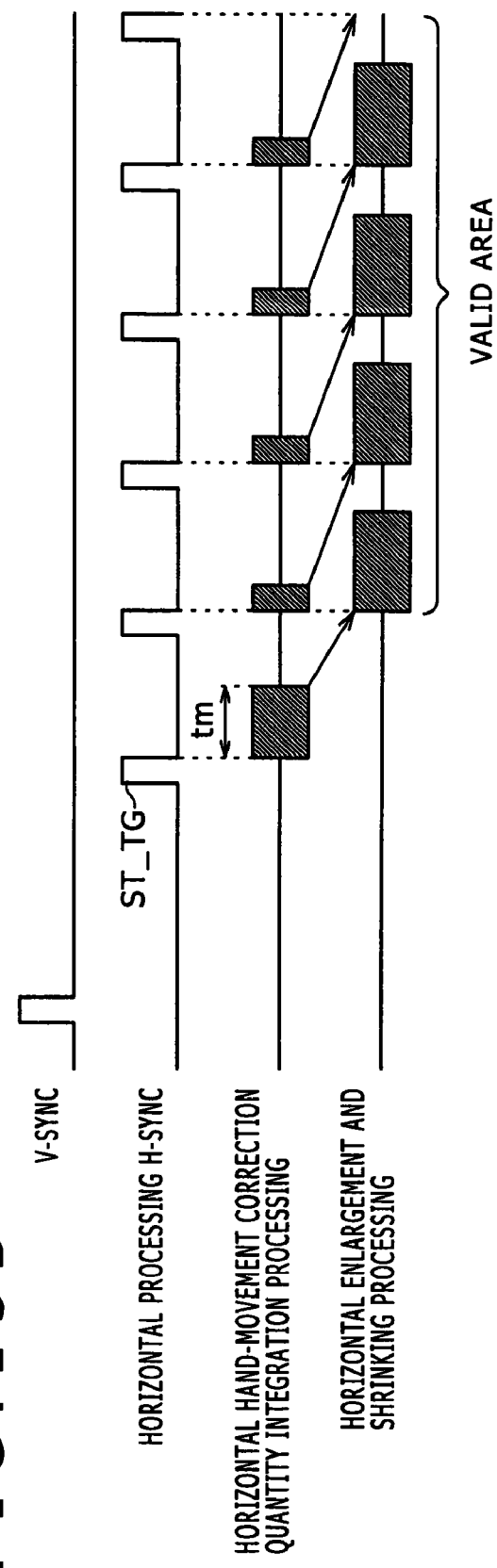

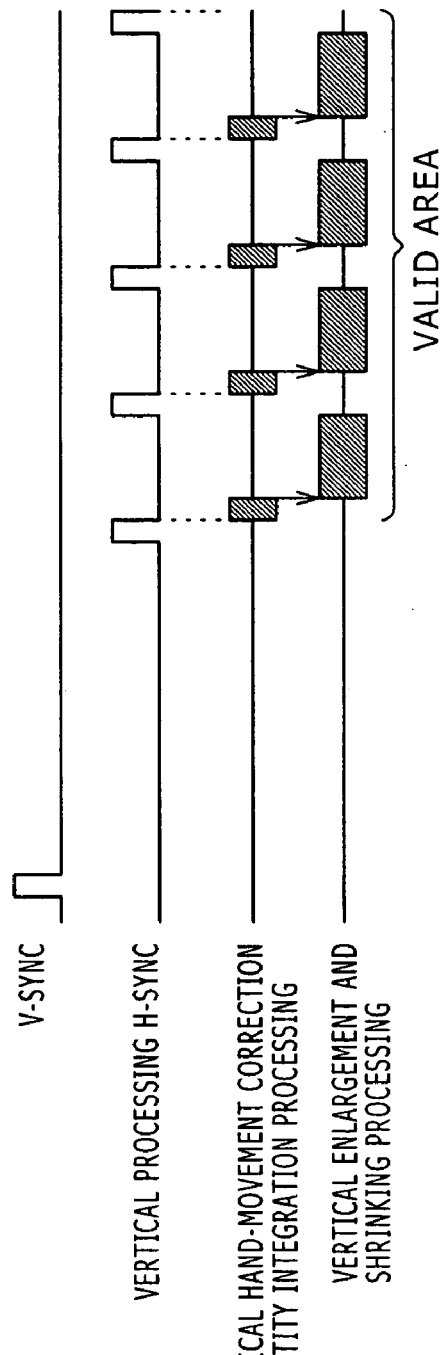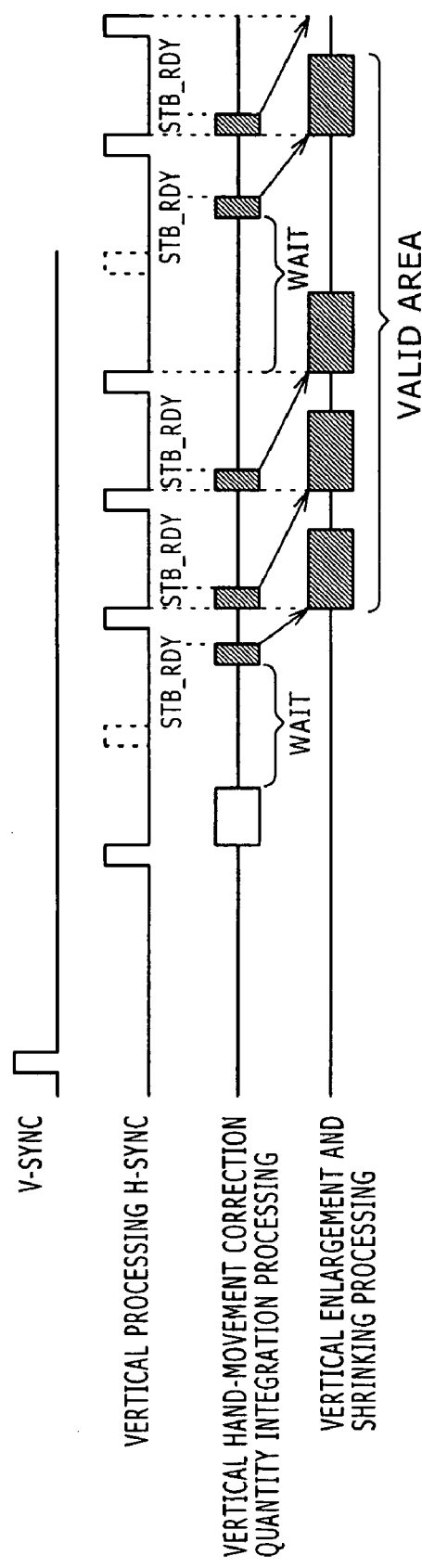

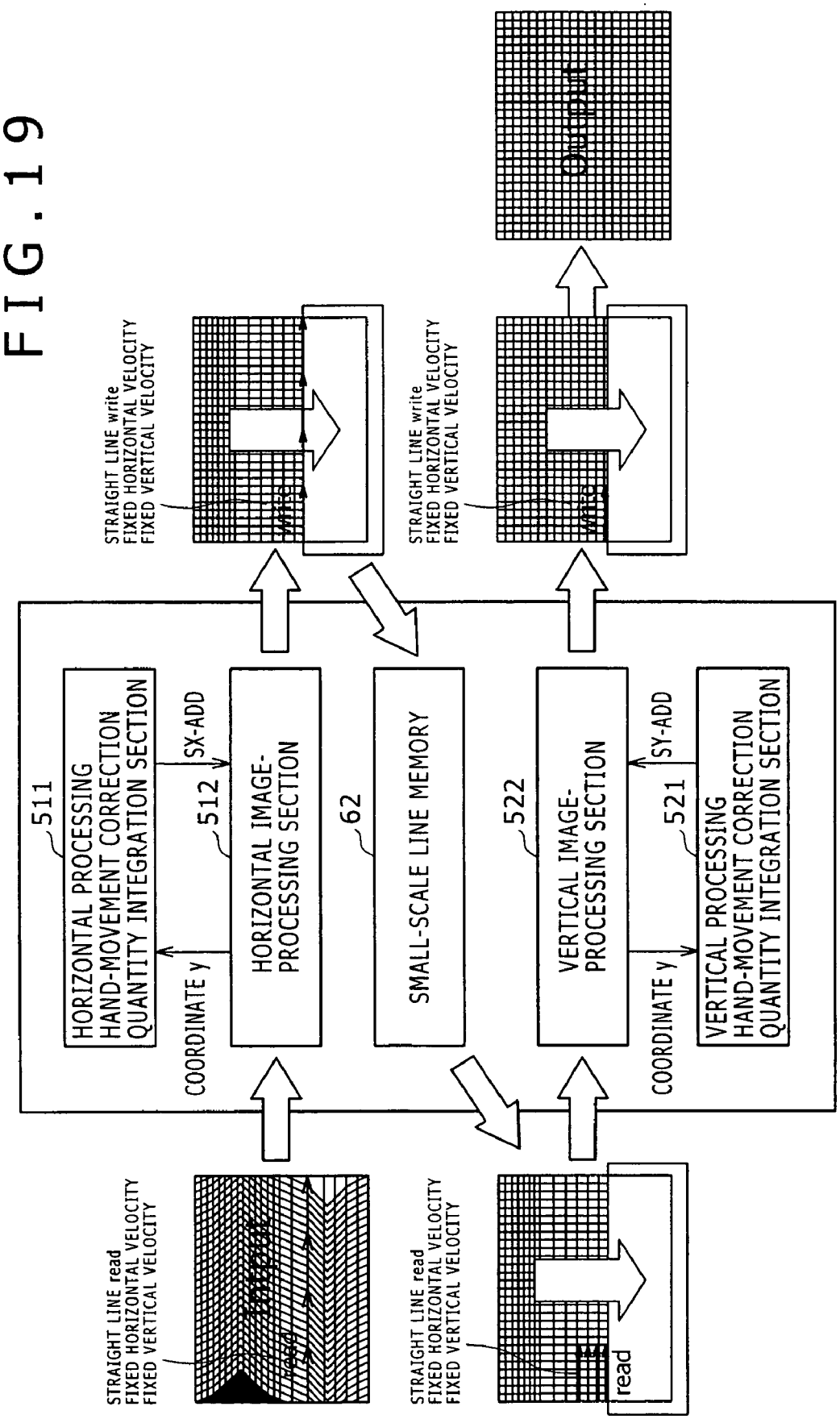

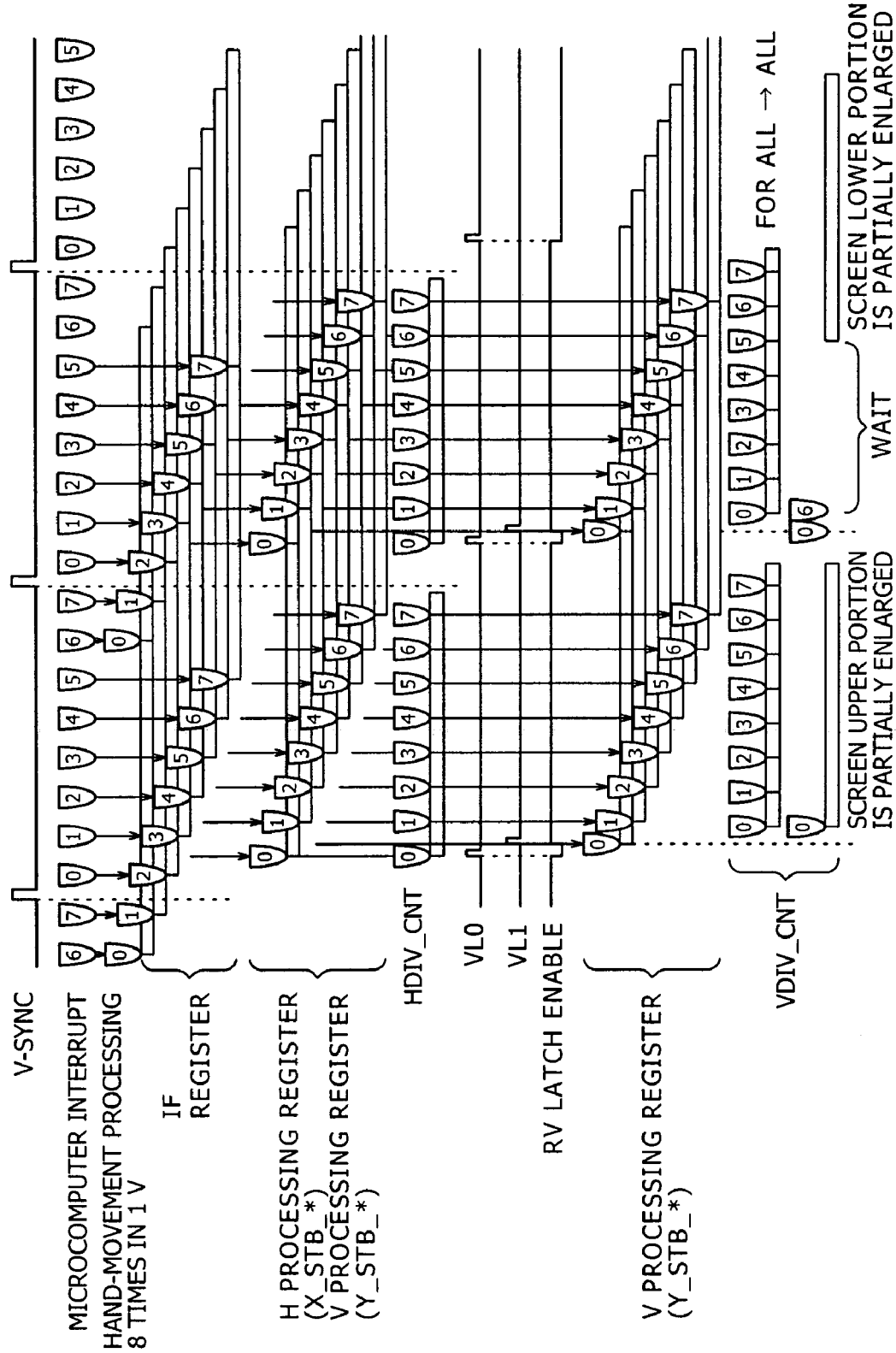

NO HAND MOVEMENT

WITH HAND MOVEMENT

PRIOR ART

UNDISTORTED TAKEN IMAGE

PRIOR ART

EXTERNAL SCENERY IS TAKEN FROM A POSITION INSIDE A RUNNING TRAIN

PRIOR ART

DISTORTION CAUSED BY A HAND MOVEMENT AS DISTORTION IN A CMOS IMAGER

PRIOR ART

METHODS FOR CORRECTING DISTORTIONS OF IMAGE-TAKING VIDEO SIGNALS AND APPARATUS FOR CORRECTING DISTORTIONS OF IMAGE-TAKING VIDEO SIGNALS

CROSS REFERENCES TO RELATED APPLICATIONS

The present application claims priority to Japanese Patent Application JP 2004-380683 filed in the Japanese Patent Office on Dec. 28, 2004, the entire contents of which being incorporated herein by reference.

BACKGROUND

The present invention relates to methods of correcting distortions generated in a taken image as distortions, which are caused by a hand movement when the image is taken by using an image-taking apparatus, and relates to apparatus for correcting such distortions by adoption of the methods. The present invention can be well applied to an image-taking apparatus such as a video camera or a digital still camera and a recording/reproduction apparatus having an image-taking function.

When a moving picture is taken by using a carried video camera, for example, a positional displacement of an image-taking device employed in the video camera may occur in the horizontal and/or vertical directions of the taken image due to a so-called hand movement. In this case, the positional displacement appears on the taken image as an image wabble.

That is to say, if there is no hand movement, a position at which a taken image is formed does not change on an image-taking plane. In other words, if a plurality of frame images is arranged in the direction of the time axis, the frame images coincide with each other completely at the same position as shown in FIG. 21A. If there is a hand movement, on the other hand, a position at which a taken image is formed changes on an image-taking plane. In other words, if a plurality of frame images is arranged in the direction of the time axis, the frame images form swaying images shown in FIG. 21B.

The phenomenon of this hand movement occurs strikingly with ease when a zoom lens is used on the telescope side. When the phenomenon of this hand movement occurs, a standstill thing appears to swing, raising a problem of a difficulty to view the image. In addition, the swinging appearance of the standstill thing also causes a phenomenon of an image showing a blurred object of photographing.

In the case of the conventional electronic image-taking apparatus, data read out from an image-taking device employed in the apparatus as data representing a taken image is subjected to digital processing carried out as a process to correct distortion of the image. By carrying out such digital processing, it is possible to correct distortion caused by a hand movement as distortion of the image.

In the conventional image-taking apparatus such as a video camera or a digital still camera and the conventional recording/reproduction apparatus having an image-taking function (or the conventional cell-phone having a camera or the conventional personal computer having a camera), as the image-taking device, a solid-state image-taking device employing a CCD (Charge Couple Device) is widely used in general. In the following description, the solid-state image-taking device employing a CCD is referred to as a CCD imager.

As described in documents such as Japanese Patent No. 3384459, which is used as patent document 1 in this specification, a large number of technologies for correcting distortions caused by a hand movement on the assumption that a CCD imager is used as an image-taking device has been proposed. As a matter of fact, products each adopting a technology for correcting distortions caused by a hand movement are widely sold in world markets. The technology for correcting distortions caused by a hand movement is referred to hereafter simply as a hand-movement correction technology.

The conventional hand-movement correction technology makes use of a characteristic that a time to sample the quantity of light accumulated in all pixels of the CCD imager is uniform throughout the structure of the CCD imager. That is to say, a sampling operation is carried out once per frame.

To put it in detail, in the CCD imager, all pixels are exposed at the same time and the whole image data of one frame is fetched with just a single timing. Thus, for all pixels of one frame, only one hand-movement displacement Vcs shown by an arrow in FIG. 22 can be considered. That is to say, a taken-image distortion caused by a hand movement as a distortion of a frame of a taken image can be corrected by correction of a reading pixel position (or a sampling pixel position) by the hand-movement displacement Vcs, which can be detected for the frame as a distortion caused by a displacement from an area Fla enclosed by a solid line in FIG. 22 as the accumulation area of the original frame of the taken image to an area FLb enclosed by a dash line in the image due to the hand movement.

It is to be noted that, in general, not all pixels of an image-taking device are treated as effective pixels as shown in FIG. 22. Instead, only pixels in a central part of the entire area AFL are used as a valid image area EFL. The entire area AFL is referred to as an effective image area including all pixels. Defined by a vertical valid length and a horizontal valid length, the valid image area EFL is obtained by excluding peripheral areas from the effective image area AFL.

With such an imager used, by using only data of pixels originally owned by the imager, it is possible to correct a distortion from the taken image as a distortion, which is resulted in when the reading pixel position changes due to a hand movement, provided that the magnitude of the hand movement is within a range smaller than the difference between the effective image area AFL and the valid image area EFL. Thus, in comparison with interpolation processing or the like in which data necessary for correction of a distortion caused by a hand movement is generated, the amount of image deterioration decreases.

By the way, in recent years, as the image-taking device of an electronic image-taking apparatus, a solid-state image-taking device having an X-Y address type is employed. The solid-state image-taking device having an X-Y address type is an image-taking device capable of outputting data of any pixel unit on the screen by specifying the horizontal-direction and vertical-direction positions of the pixel. The horizontal-direction position is also referred to as an X-direction position and the vertical-direction position is also referred to as a Y-direction position. An example of the solid-state image-taking device having an X-Y address type is a CMOS-type solid-state image-taking device, which is referred to hereafter as a CMOS imager.

The CMOS imager has the following features:

(a) The CMOS imager is an imager of an amplifying type. Since an amplified signal is read out, the imager offers a high sensitivity (b) Since a CMOS circuit is employed, the power consumption is low (c) The CMOS imager can be manufactured at a low cost (d) As a rule, the CMOS imager is capable of outputting data of any pixel selected at random or making an access to any pixel selected at random.

Thus, even though the CMOS imager is capable of outputting data of a taken image in pixel units, in practicality, the CMOS imager generally outputs (or samples) the data of a taken image in pixel-group units each including pixels on one horizontal line in a process to output the data.

If the CMOS imager outputs data of a taken image in horizontal-line units as described above, as shown in FIG. 23, there is a time shift Δt between exposure times of adjacent horizontal lines. The time shift Δt is equal to a difference between in reading time between the adjacent horizontal lines. It is to be noted that, if the CMOS imager outputs data of a taken image in pixel units, a difference in reading time between adjacent pixels is so smaller than the difference between in reading time between adjacent horizontal lines so that the difference between in reading time between adjacent pixels can be ignored. Even if the CMOS imager outputs data of a taken image in pixel units, however, there is still a similar time shift between exposure times.

Because of what is described above, in the case of an image-taking apparatus employing a CMOS imager, for an image that should naturally be obtained as shown in FIG. 24A as an image showing a vertically erected house and a vertically erected tree, when the image is taken from a position inside a running train, for example, an image of a slanting house and an inclined tree is actually obtained as shown in FIG. 24B. The difference between the images shown in FIGS. 24A and 24B is a result of the so-called focal plane phenomenon peculiar to the CMOS image.

The typical image shown in FIG. 24 (B) is an image, which is taken while the image-taking apparatus is moving in the horizontal direction. If the image of a photographing object is taken while the image-taking apparatus is moving in the vertical direction, however, the resulting image will show the object shrunk or expanded in the vertical direction as shown in none of the figures.

The phenomenon described above occurs strikingly when the relative velocity between the object of photographing and the image-taking apparatus employing the CMOS imager. For example, the phenomenon described above occurs strikingly when the photographer takes an image of the photographing object by using the image-taking apparatus while moving at a high velocity or, conversely, when the photographer staying at a fixed location takes an image of the photographing object, which is moving at a high velocity. In the case of ordinary photographing, however, such a situation can be said to be a situation that occurs rarely.

When the photographer takes an image of the photographing object by using the image-taking apparatus held in its hand, however, the hand may move a little bit at a high velocity. In this case, the focal plane phenomenon described above occurs due to the hand movement.

This is because the value of a hand movement happening to a CMOS imager is not one value in a frame as is the case with a CCD imager but, as described above, a value varying from pixel to pixel or horizontal line to horizontal line due to differences in sampling time between the pixels in the frame or between the horizontal lines in the frame. For this reason, in an image-taking apparatus employing a CMOS imager, a distortion caused by the focal plane phenomenon described above remains uncorrected even if a correction process merely using a hand-movement quantity for one frame is carried out. In the following description, a hand movement happening to a CMOS imager is also referred to as a CMOS hand movement.

In the case of an image-taking apparatus employing a CMOS imager, a queer squashy distortion like one shown in FIG. 24C is observed in the output of a taken image of a photographing object in the event of a hand movement due to the fact that the direction, magnitude and velocity of the hand movement are not uniform in a frame or the taken image.

By the way, in the case of an apparatus for taking a still image, as preconditions for still-image photographing, it is assumed that the magnitude of a hand movement is limited and a mechanical shutter is employed so that a focal plane phenomenon caused by a CMOS hand movement can be avoided relatively with ease. An example of the apparatus for taking a still image is a digital still camera.

In the case of another kind of image-taking apparatus such as a video camera, on the other hand, a moving picture photographing is assumed. Thus, a moving picture-taking apparatus for business applications or for a moving picture-taking apparatus of a high-class category adopts a method for virtually preventing a focal plane phenomenon from occurring due to a CMOS hand movement. In accordance with this method, a maximum difference in sampling time in one frame is reduced and the data of a taken image is read out at a very high velocity.

In addition, the magnitude of a hand movement relative to an object of photographing rises as the magnification of an optical zoom is increased. Thus, if the image-taking apparatus does not have an optical-zoom function or the image-taking apparatus has an optical-zoom function but the magnification of the optical zoom is small, the CMOS hand movement does not raise a big problem even in an application of taking moving pictures. In the first place, for an inexpensive image-taking apparatus where even a distortion caused by a hand movement is not corrected by using an acceleration sensor as is the case with the conventional image-taking apparatus employing the CCD imager, a bad effect caused by the CMOS hand movement is relatively small, not even raising a problem in many cases.

In order to solve the problems described above, there has been demanded a technology for correcting and avoiding a distortion of a focal plane phenomenon caused by a CMOS hand movement as a technology that can be implemented with a high degree of precision at a low cost in an image-taking apparatus having a high-magnification optical zoom function for taking moving pictures as a main application by carrying out digital-signal processing and with neither employing a special device nor utilizing a high-velocity sampling clock signal.

By the way, Japanese Patent Laid-open No. 2004-266322 serving as patent document 2 describes a method to correct a distortion including a focal plain phenomenon caused by a CMOS hand movement in a taken image.

In accordance with the distortion correction method described in patent document 2, when data of a taken image is read out from the CMOS imager in horizontal-line units, a positional displacement quantity caused by a generated hand movement for each horizontal line is detected and a correction is made so as to read out the data of the taken image from a position shifted from the original position by the detected positional displacement quantity in a direction opposite to the direction of the hand movement. The positional displacement quantity is also referred to hereafter as a hand-movement quantity.

However, this method raises a problem of a difficulty to obtain a hand-movement quantity for each horizontal line as a problem caused by conditions such as the sampling frequency of a sensor for detecting a hand movement. In order to solve this problem, in accordance with the distortion correction method described in patent document 2, a hand-movement quantity is detected discretely in the vertical direction of the screen every plurality of horizontal lines as shown in FIG. 25A. In the example shown in FIGS. 25A to 25C, hand-movement quantities Q1, Q2, Q3 and so on are detected every 50 horizontal lines as shown in FIG. 25B. It is to be noted that the figure shows only hand-movement quantities in the horizontal direction.

The hand-movement quantities of the remaining 49 horizontal lines not directly subjected to the process to detect hand-movement quantities, that is, the hand-movement quantities of the horizontal lines other than the horizontal line subjected to the process to detect hand-movement quantities, are found by interpolation based on the hand-movement quantities Q1, Q2, Q3 and so on. As the interpolation method, it is possible to adopt some techniques, one of which is shown in FIG. 25C. In accordance with the interpolation method shown in FIG. 25C, basically, the interpolation to find a hand-movement quantity of any specific one of 49 horizontal lines not subjected to the process to detect hand-movement quantities is based on 2 hand-movement quantities Qn and Qn+1 where notation n in the subscript denotes an integer at least equal to 1. The hand-movement quantity Qn is the hand-movement quantity of a horizontal line immediately preceding the 49 horizontal lines while the hand-movement quantity Qn+1 is the hand-movement quantity of the a horizontal line immediately succeeding the 49 horizontal lines.

In accordance with interpolation method (1) shown in FIG. 25C, for example, the detected hand-movement quantity Qn of the horizontal line immediately preceding the 49 horizontal lines is used as it is for the horizontal in the first half of the 49 horizontal lines. On the other hand, the detected hand-movement quantity Qn+1 of the horizontal line immediately succeeding the 49 horizontal lines is used as it is for the horizontal in the second half of the 49 horizontal lines.

In accordance with interpolation method (2) shown in FIG. 25C, on the other hand, values represented by a straight line connecting the detected hand-movement quantity Qn of the horizontal line immediately preceding the 49 horizontal lines and the detected hand-movement quantity Qn+1 of the horizontal line immediately succeeding the 49 horizontal lines are used as hand-movement quantities of the 49 horizontal lines. That is to say, interpolation method (2) is the so-called average value interpolation method.

By adoption of any of the distortion correction methods described in patent document 2, it is possible to correct a distortion including a focal plain phenomenon caused by a CMOS hand movement in an image taken by using a CMOS imager.

However, even though patent document 2 describes a method to reduce a focal plane phenomenon on one screen (or one frame) of a taken image, the reference does not disclose a method to eliminate an effect of an inter-frame hand movement described above in the case of a moving picture. Thus, with only the disclosed method, it is impossible to eliminate the effect of an inter-frame hand movement described above in the case of a moving picture.

If the technology disclosed in patent document 1 is adopted, on the other hand, an inter-frame hand movement can be corrected. However, it is impossible to correct an image distortion such as the focal plane described above in a frame.

SUMMARY

Addressing the problems described above, inventors of the present invention have devised a method and an apparatus, which are capable of both reducing distortion caused by an inter-frame hand movement at a moving picture-photographing time as distortion of a taken image and reducing distortion attributed to a focal plane phenomenon caused by typically a hand movement in a frame as distortion of the taken image even the apparatus is an image-taking apparatus employing typically a CMOS imager as an image-taking device having an X-Y address type.

In order to solve the problems described above, in accordance with a first embodiment of the present invention, there is provided a method for correcting distortions contained in a signal representing a taken image of a moving picture as distortions caused by a positional change, which occurs in the horizontal and/or vertical directions of the taken image at a time to photograph the moving picture as a positional change of an image-taking device. The method includes:

an inter-frame correction step of detecting an inter-frame correction quantity for the positional change of the image-taking device in a frame period of the taken image and correcting the positional change by elimination of a displacement occurring between a frame and the next frame as a displacement of the taken image on the basis of the detected inter-frame correction quantity; and an intra-frame correction step of computing an intra-frame correction quantity for the positional change of the image-taking device at each of a plurality of locations on one screen of the taken image and correcting a distortion caused by the positional change on the screen of the taken image as a distortion of the taken image on the basis of the computed intra-frame correction quantity.

In accordance with the first embodiment of the present invention, at the inter-frame correction step, an inter-frame correction process is carried out to correct the positional change by elimination of a displacement occurring between a frame and the next frame as a displacement of the taken image. At the intra-frame correction step, on the other hand, a distortion attributed to a focal plane phenomenon caused by typically a hand movement in a frame can be corrected.

Thus, even if there is a hand movement, the wabble of the image can be corrected to result in a taken image having corrected distortion in a frame as an image of a moving picture.

In addition, according to a second embodiment of the present invention, the method for correcting distortions contained in a signal representing a taken image as distortions caused by a positional change in accordance with the first aspect of the present invention is characterized in that:

at the inter-frame correction step, the inter-frame correction quantity is detected by a computer through execution of software; and at the intra-frame correction step, on the other hand, the intra-frame correction quantity is computed by hardware.

In accordance with the second embodiment of the present invention, at the inter-frame correction step, the inter-frame correction quantity is detected by software and, at the intra-frame correction step, on the other hand, the inter-frame correction quantity is computed by hardware. Thus, processing can be carried out with a high degree of efficiency.

In addition, according to a third embodiment of the present invention, the method for correcting distortions contained in a signal representing a taken image as distortions caused by a positional change in accordance with the first embodiment of the present invention is characterized in that the intra-frame correction step includes the steps of:

dividing one screen segment of the taken image into a plurality of image sub-segments;

detecting the rate of the positional change for each of the image sub-segments;

computing the intra-frame correction quantity for a member subjected to a distortion correction process as a member of the taken image on the basis of the rate detected for each of the image sub-segments as the rate of the positional change in each of the image sub-segments; and correcting a distortion caused by the positional change on one screen of the taken image as a distortion in the taken image.

In accordance with the third embodiment of the present invention, one screen segment of the taken image is divided into a plurality of image sub-segments and a distortion in the taken image is corrected on the basis of the rate detected for an image sub-segment as the rate of the positional change of the image-taking device. Thus, a hand movement causing the positional change can be detected without difficulties and a sufficient distortion correction effect in the sense of sight can be obtained.

In addition, according to a fourth embodiment of the present invention, the method for correcting distortions contained in a signal representing a taken image as distortions caused by a positional change in accordance with the third embodiment of the present invention is characterized in that the method includes the steps of:

integrating the rate detected as the rate of the positional change for each of the image sub-segments over the period of the image sub-segment in order to find a time-integration value to be used as the intra-frame correction quantity for a member subjected to a distortion correction process as a member of the taken image; and using the time-integration value to correct a distortion of the taken image.

In accordance with the fourth embodiment of the present invention, at the step of integrating a rate detected as the rate of the positional change for each of the image sub-segments over the period of the image sub-segment, a time-integration value is found as a value to be used as the intra-frame correction quantity for a member subjected to a distortion correction process as a member of the taken image and the time-integration value is used as a value for correcting a distortion of the taken image. Thus, with a short processing delay, it is possible to correct a distortion including typically a focal plane phenomenon as a phenomenon of the taken image. In addition, since a time-integration value is used, no shift occurs on the taken image even on a border sandwiched by adjacent image sub-segments as a border on which the rate of the positional change varies.

In accordance with the present invention, a wabble caused by a hand movement as a wabble of a moving picture can be corrected to produce a taken image with its distortion corrected as a taken image of the moving picture. As described earlier, in this case, the distortion of the taken image is distortion caused by typically a focal plane phenomenon occurring in a frame of the image.

Additional features and advantages are described herein, and will be apparent from, the following Detailed Description and the figures.

BRIEF DESCRIPTION OF THE FIGURES

FIG. 4 is a block diagram referred to in describing a typical configuration of an embodiment implementing an apparatus for correcting distortions of a taken image in accordance with the present invention.

FIGS. 15A and 15B are explanatory diagrams showing operation timings of the horizontal image-processing section shown in FIG. 14.

FIGS. 18A and 18B are explanatory diagrams showing operation timings of the vertical hand-movement correction quantity integration section shown in FIG. 17.

FIG. 19 is an explanatory block diagram referred to in describing operations carried out by a signal-processing section employed in the embodiment shown in FIG. 4 as an embodiment implementing an apparatus for correcting distortions of a taken image.

FIG. 20 is an explanatory block diagram referred to in describing timings of operations of registers employed in a register block of the signal-processing section employed in the embodiment shown in FIG. 4 as an embodiment implementing an apparatus for correcting distortions of a taken image.

DETAILED DESCRIPTION

By referring to diagrams, the following description explains an embodiment implementing a method for correcting distortions in the signal of a taken image in accordance with the present invention and an embodiment implementing an apparatus adopting the method. The embodiments described below are each relate to correcting distortions caused by a CMOS hand movement described earlier as distortions of an image taken by using a CMOS imager, which is a solid-state image-taking device of the X-Y address type.

Figure 1:
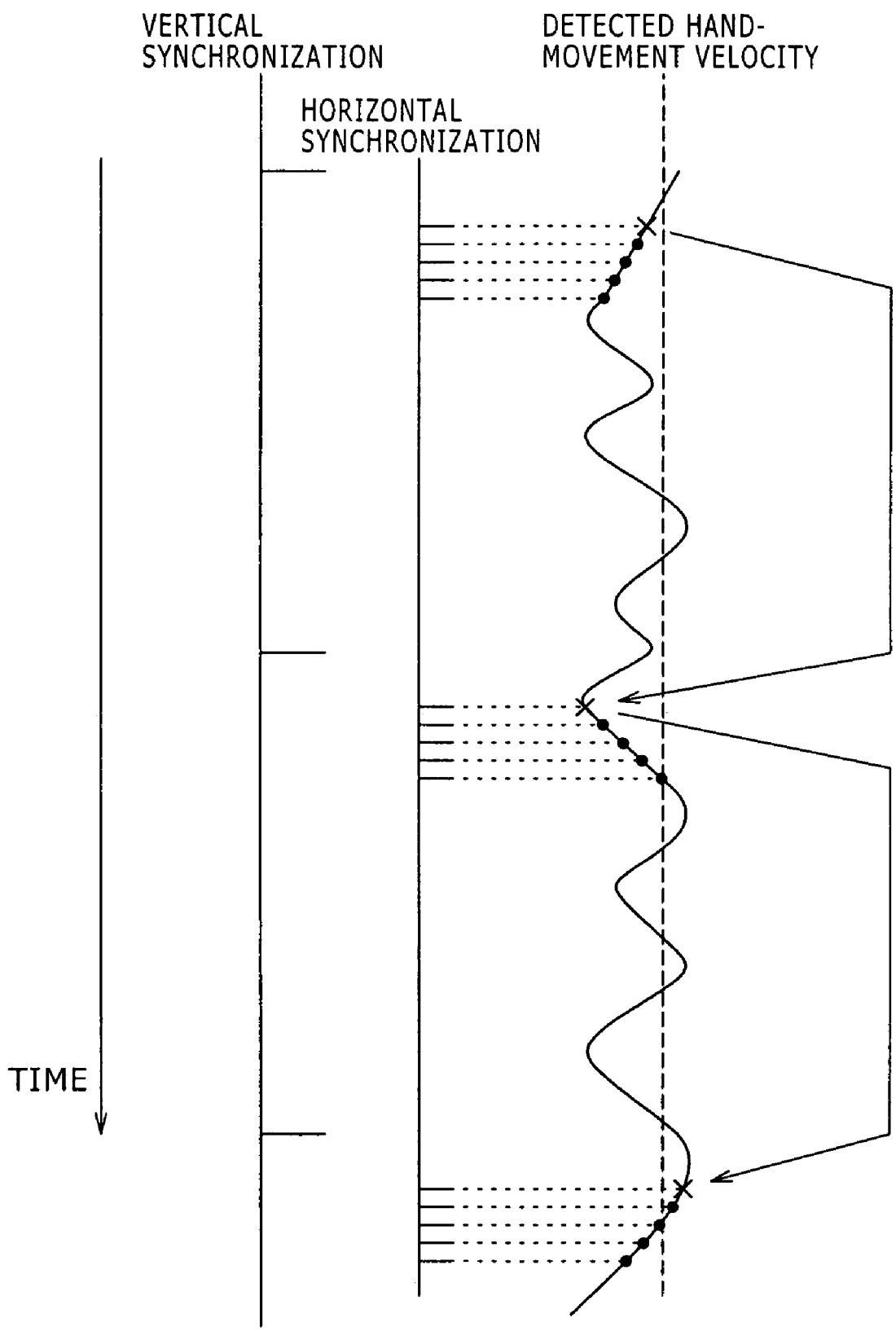
FIG. 1 is an explanatory diagram referred to in describing an outline of an embodiment implementing a method to correct distortions of a taken image in accordance with the present invention.

FIG. 1 shows timing charts referred to in explaining an outline of an embodiment implementing the method for correcting distortions in the signal of a taken image in accordance with the present invention. In this embodiment, in order to correct an inter-frame hand movement, an output obtained as a result of detecting the velocity of the hand movement is integrated over a time period equal to one frame period (or one vertical period) to compute the magnitude of an inter-frame hand movement in the frame period. The magnitude of an inter-frame hand movement is obtained as a result of execution of software by a microcomputer to integrate the detected velocity of the hand movement sequentially at predetermined discrete intervals over the frame period.

As indicated by an X mark shown in FIG. 1, the magnitude of an inter-frame hand movement is acquired synchronously with a vertical synchronization signal. Then, an inter-frame correction quantity is found from the acquired magnitude of an inter-frame hand movement. Subsequently, the processing-start coordinates of the head of the next frame are found from the inter-frame correction quantity. The processing-start coordinates are the absolute coordinates of a pixel on the image-taking device. The information on the processing-start coordinates is supplied to an intra-frame correction circuit block to be set therein.

In this embodiment, the intra-frame correction circuit block is implemented by hardware. The intra-frame correction circuit block of this embodiment finds an intra-frame correction quantity with a timing synchronized to the horizontal synchronization signal. The intra-frame correction quantity is a hand-movement correction quantity for a horizontal line. The hand-movement correction quantity for a horizontal line is used for correcting the coordinates of the horizontal line in the vertical and horizontal directions.

Ideally, it is convenient to find the hand-movement correction quantity for a horizontal line by sampling a detection output of the velocity of a hand movement every horizontal period as indicated by a dotted mark shown in FIG. 1 and using the sampled detection outputs of the velocity of the hand movement as a base for finding the hand-movement correction quantity. However, it is difficult to take one horizontal period as the interval to sample the output of a hand-movement velocity sensor. In order to solve this problem, in this embodiment, as will be described later, one screen segment is divided into a plurality of image sub-segments and, throughout each of the image sub-segments, the velocity of the hand movement is assumed to be uniform. Then, a hand-movement correction quantity of a horizontal line is obtained for each of the image sub-segments. Next, an outline of an intra-frame hand-movement correction process is explained.

Figure 2:
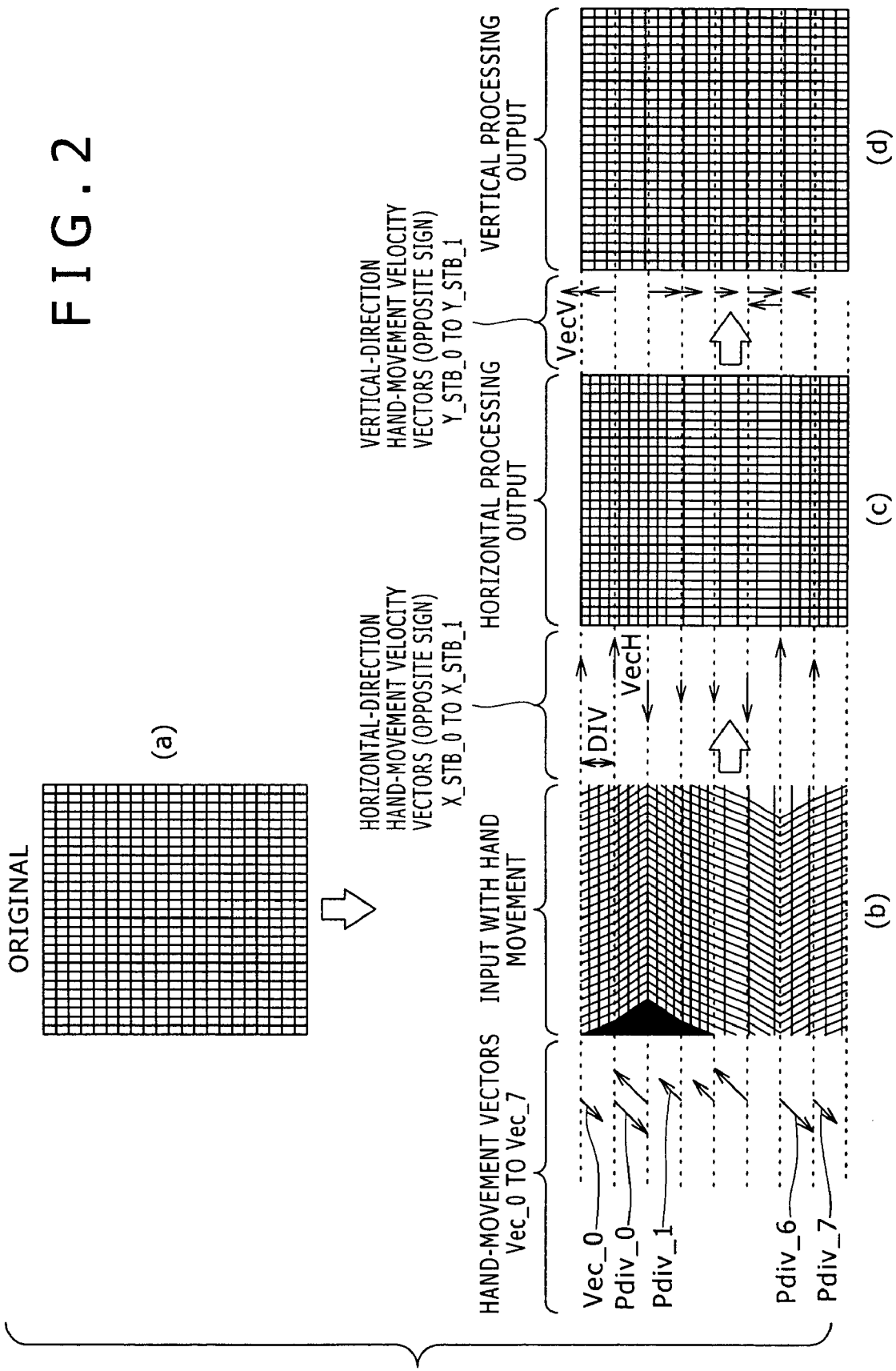
FIG. 2 is an explanatory diagram referred to in describing principal elements of the outline of the embodiment implementing a method to correct distortions of a taken image in accordance with the present invention.

An outline of an intra-frame hand-movement correction process is explained as follows. FIG. 2 is an explanatory diagram referred to in describing principal elements of the outline of the embodiment implementing a method to correct distortions of a taken image in accordance with the present invention. As shown in (a) of FIG. 2, in order to make the reader easily understand distortion generated in an image due to a CMOS hand movement, a lattice pattern consisting of a large number of rectangles is assumed as an original image with no distortion. Thus, an image distortion caused by a CMOS hand movement appears as deformation of the rectangles composing the lattice pattern.

Figure 22:
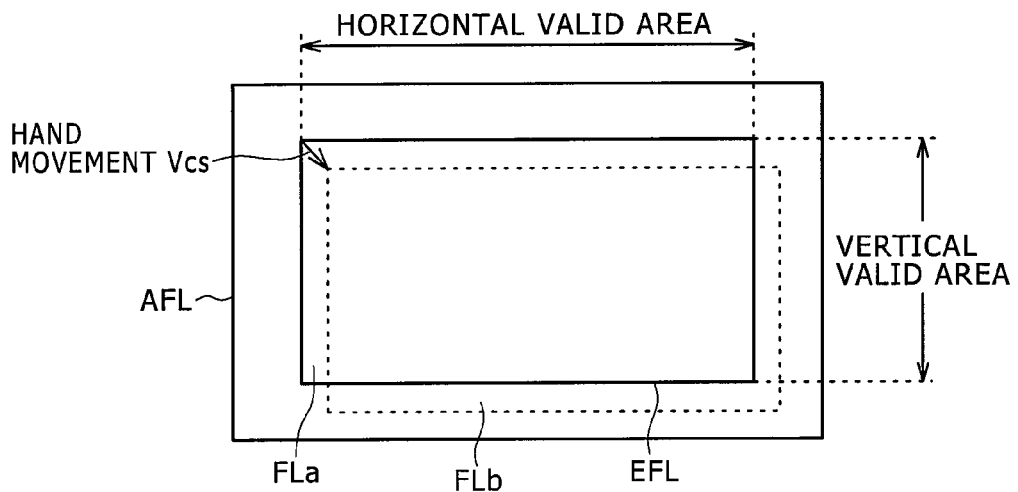
FIG. 22 is an explanatory diagram referred to in description of the conventional process to correct distortions caused by an inter-frame hand movement.
Figure 23:
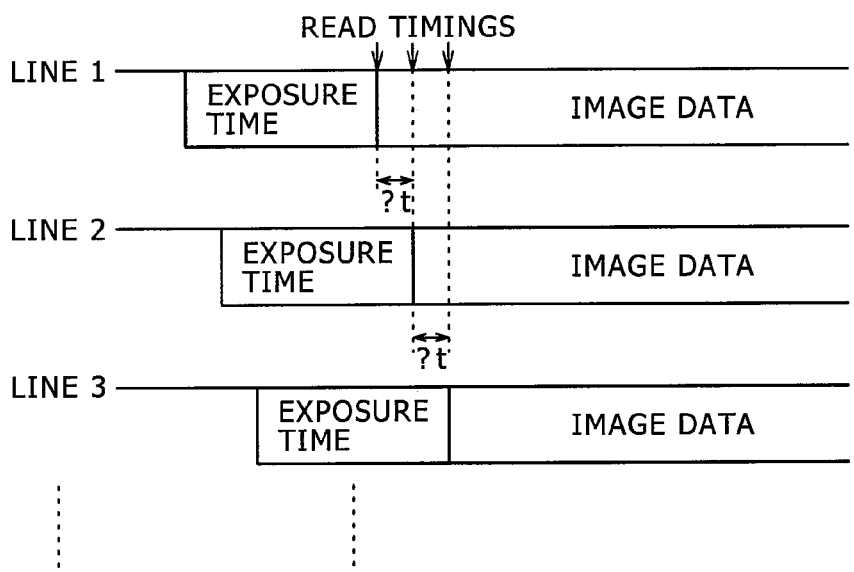
FIG. 23 is an explanatory diagram referred to in describing causes of distortions in an image created on a CMOS imager affected by an intra-frame hand movement.
Figure 24A:
FIGS. 24A to 24C are explanatory diagrams referred to in description of distortions caused by an intra-frame hand movement as distortions in an image on a CMOS imager.
Figure 24B:
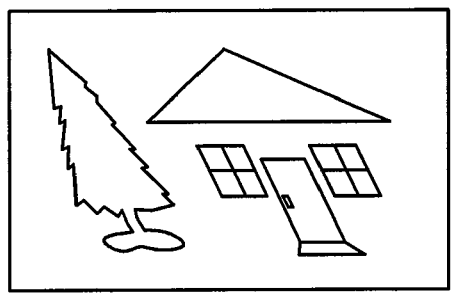
Figure 24C:
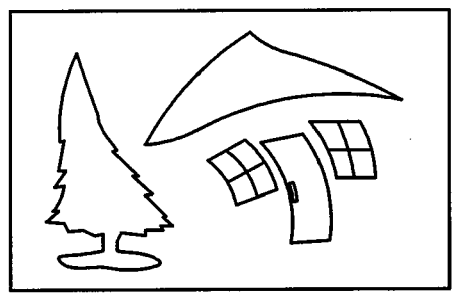

It is to be noted that, also in this embodiment, the CMOS imager has an effective pixel area AFL with a range wider than a valid pixel area EFL defined by a vertical valid length and a horizontal valid length for 1 vertical period as shown in FIG. 22. It is also worth noting that an image of a screen shown in (a) to (d) of FIG. 2 is an image with a size larger than the valid pixel area EFL shown in FIG. 22.

In this embodiment, the pixel clock velocity in the horizontal direction is much higher than the velocity of the hand movement. In addition, data of the taken image is read out sequentially in horizontal-line units and distortion caused by the hand movement is corrected also in horizontal-line units.

In addition, in the case of this embodiment, an image segment of the valid pixel area EFL of the CMOS imager is divided into a plurality of equal image sub-segments Pdiv arranged in the vertical direction as shown in (b), (c), and (d) of FIG. 2. It is assumed that each of the image sub-segments Pdiv is displaced by a hand movement at a uniform velocity of the hand movement. The number of image sub-segments Pdiv is determined by considering the size of each of the image sub-segments Pdiv, which provide a sufficient correction effect in a process to correct a distortion caused by a hand movement. In an example described below, the image segment of the valid pixel area EFL of the CMOS imager is divided into eight equal image sub-segments Pdiv arranged in the vertical direction. That is to say, an image sub-segment Pdiv is a division obtained as a result of dividing a vertical synchronization signal by 8.

An image sub-segment Pdiv includes a plurality of horizontal lines. In the case of this embodiment, it is assumed that the horizontal lines included in an image sub-segment Pdiv experience displacement by a hand movement at a uniform velocity of the hand movement in execution of a process to correct a distortion caused by the hand movement.

In addition, in this embodiment, a hand-movement velocity vector for a first horizontal line of each of the eight image sub-segments Pdiv_0 to Pdiv_7 is represented by an arrow on the left side of (b) of FIG. 2. The hand-movement velocity vector is detected by using a velocity detection section. That is to say, in this example, for a taken image of one screen, the hand-movement velocity vector is detected discretely at each of eight locations.

The image shown in (b) of FIG. 2 includes taken-image distortion caused by a hand movement, which is made at a velocity represented by a hand-movement velocity vector shown as an arrow on the left side for each of the image sub-segments Pdiv. In this embodiment, taken-image distortion caused by a hand movement is apportioned to a horizontal-direction and vertical-direction processes for correcting sub-distortions in their respective directions.

Details of the distortion correction processing will be described later. In this embodiment, first of all, a process to correct distortions in the horizontal direction is carried out, being followed by a process to correct distortions in the vertical direction. In this case, at a stage allowing the process of correcting distortions in the vertical direction to be carried out even before the process to correct distortions in the horizontal direction for all data of one screen of a taken image is completed, the process to correct distortions in the vertical direction is started and carried out concurrently with the process to correct distortions in the horizontal direction. In this way, the processes to correct distortions in the vertical and horizontal directions can be performed with a high degree of efficiency.

In this embodiment, first of all, in order to correct a horizontal-direction image distortion caused by a hand movement, opposite-sign components X_STB_0 to X_STB_7 of horizontal-direction components of hand-movement velocity vectors Vec_0 to Vec_7 detected for the eight image sub-segments Pdiv_0 to Pdiv_7 respectively are found. The opposite-sign components X_STB_0 to X_STB_7 are each represented by an arrow on the left side of (c) of FIG. 2 and arrows on the left side of FIG. 3. In the following description, the opposite-sign components X_STB_0 to X_STB_7 of the horizontal-direction components of the hand-movement velocity vectors Vec_0 to Vec_7 respectively are each referred to as a horizontal correction velocity component. The hand-movement velocity vectors Vec_0 to Vec_7 are each denoted by generic symbol Vec in case it is not necessary to distinguish the hand-movement velocity vectors Vec_0 to Vec_7 from each other. By the same token, the horizontal correction velocity components X_STB_0 to X_STB_7 are each denoted by generic symbol X_STB in case it is not necessary to distinguish the opposite-sign components X_STB_0 to X_STB_7 from each other.

Then, a correction quantity for correcting a distortion caused by hand movement in the horizontal direction for each of horizontal lines in an image sub-segment Pdiv (any of Pdiv_0 to Pdiv_7) is computed by integrating the corresponding horizontal correction velocity component X_STB (the corresponding one of X_STB_0 to X_STB_7) found as described above along the time axis for the horizontal lines with the horizontal-line point at the start of the time axis for the image sub-segment Pdiv (any of Pdiv_0 to Pdiv_7) used as the reference point of the integration. Integration results SX_ADD shown on the right side of FIG. 3 are each referred to as a hand-movement correction quantity in the horizontal direction or simply as a horizontal hand-movement correction quantity.

Figure 3:
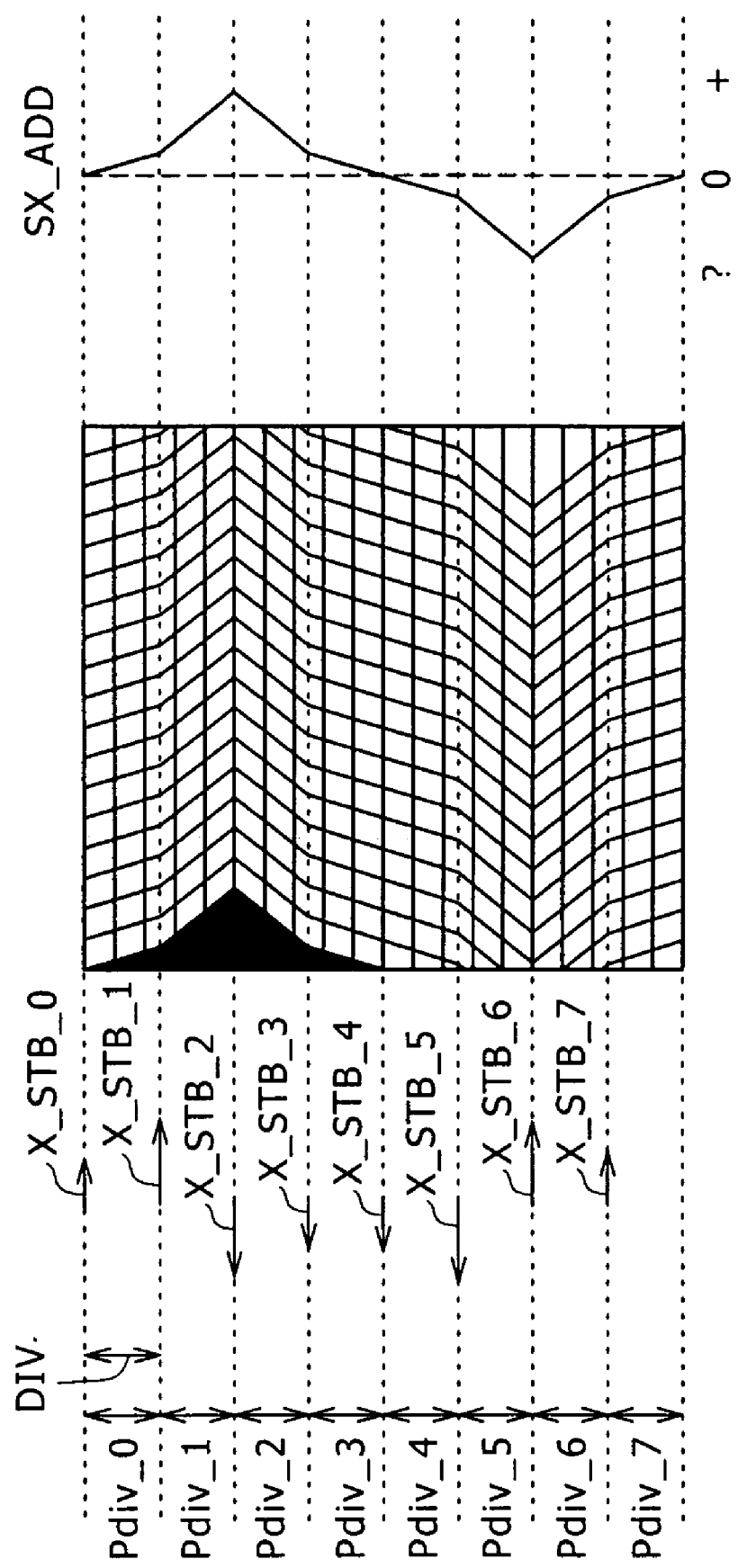
FIG. 3 is an explanatory diagram referred to in describing principal elements of the outline of the embodiment implementing a method to correct distortions of a taken image in accordance with the present invention.

As is evident from FIG. 3, the horizontal hand-movement correction quantity SX_ADD changes from horizontal line to horizontal line at a fixed gradient in each of the image sub-segments Pdiv_0 to Pdiv_7. Since the horizontal hand-movement correction quantity SX_ADD is a result of integration carried out over each of the image sub-segments Pdiv_0 to Pdiv_7, values of the horizontal hand-movement correction quantity SX_ADD in the neighborhood of the boundary between any two adjacent image sub-segments are represented by segments forming an angle at a corner of a polygonal line. These segments much deviate from a continuous line.

In a process to correct distortions in the horizontal direction, the horizontal hand-movement correction quantity SX_ADD found for each horizontal line of a taken image on the CMOS imager as described above is used for correcting the horizontal-direction read start position of the horizontal line so as to correct the taken image. That is to say, let us assume that the horizontal-direction read start position of any horizontal line has been shifted by a hand movement in the horizontal direction as shown in (b) of FIG. 2. In this case, by using the horizontal hand-movement correction quantity SX_ADD found for the horizontal line, the horizontal-direction read start position of the horizontal line can be corrected to eliminate a distortion in the horizontal direction so as to produce an image like one shown in (c) of FIG. 2.

The image shown in (c) of FIG. 2 is an image obtained as a result of correcting distortions in an image shown in (b) of FIG. 2. However, the image shown in (c) of FIG. 2 still includes distortions in the vertical direction. It is to be noted that an image shown in (b) of FIG. 2 is a distorted image containing distortions in both the horizontal and vertical directions.

In order to correct the distortions in the vertical direction, in this embodiment, opposite-sign components Y_STB_0 to Y_STB_7 of vertical-direction components of hand-movement velocity vectors Vec_0 to Vec_7 detected for the eight image sub-segments Pdiv_0 to Pdiv_7 respectively as shown by arrows on the left side of (d) of FIG. 2 are found. The opposite-sign components Y_STB_0 to Y_STB_7 are each represented by an arrow on the left side of (d) of FIG. 2. In the following description, the opposite-sign components Y_STB_0 to Y_STB_7 of the vertical-direction components of the hand-movement velocity vectors Vec_0 to Vec_7 respectively are each referred to as a vertical correction velocity component. The vertical correction velocity components Y_STB_0 to Y_STB_7 are each denoted by generic symbol Y_STB in case it is not necessary to distinguish the opposite-sign components Y_STB_0 to Y_STB_7 from each other.

Then, a correction quantity for correcting a distortion caused by a hand movement in the vertical direction for each of horizontal lines in an image sub-segment Pdiv (any of Pdiv_0 to Pdiv_7) is computed by integrating the corresponding vertical correction velocity component Y_STB (the corresponding one of Y_STB_0 to Y_STB_7) found as described above along the time axis for the horizontal lines with the horizontal line point at the start of the time axis for the image sub-segment Pdiv (any of Pdiv_0 to Pdiv_7) used as the reference point of the integration.

Integration results SY_ADD shown in none of the figures are each referred to as a hand-movement correction quantity in the vertical direction or simply as a vertical hand-movement correction quantity. The vertical hand-movement correction quantity SY_ADD changes from horizontal line to horizontal line at a fixed gradient in each of the image sub-segments Pdiv_0 to Pdiv_7. Since the vertical hand-movement correction quantity SY_ADD is a result of integration carried out over each of the image sub-segments Pdiv_0 to Pdiv_7, values of the vertical hand-movement correction quantity SY_ADD in the neighborhood of the boundary between any two adjacent image sub-segments are represented by segments forming an angle at a corner of a polygonal line. These segments much deviate from a continuous line.

In a process to correct distortions in the vertical direction, the vertical hand-movement correction quantity SY_ADD found for each horizontal line of a taken image on the CMOS imager as described above is used for correcting the vertical-direction read start position of the horizontal line so as to correct the taken image. That is to say, let us assume that the vertical-direction read start position of any horizontal line has been shifted by a hand movement in the vertical direction as shown in (c) of FIG. 2. In this case, by using the vertical hand-movement correction quantity SY_ADD found for the horizontal line, the vertical-direction read start position of the horizontal line can be corrected to eliminate a distortion in the vertical direction in the same way as the elimination of a distortion in the horizontal direction so as to produce an image like one shown in (d) of FIG. 2.

The horizontal hand movement correction quantity and the vertical hand movement correction quantity are used in correction of image distortions caused by a focal plane phenomenon attributed to a hand movement happening to a CMOS imager in the same way as the distortion correction method described in patent document 2.

In the case of the distortion correction method described in patent document 2, however, the hand-movement quantities for horizontal lines at discrete sampling locations are detected and the hand-movement quantities for the remaining horizontal lines located between the horizontal lines at the discrete locations are not detected directly, but found by interpolation based on the hand-movement quantities for the horizontal lines at the discrete locations.

Thus, in the case of the distortion correction method described in patent document 2, the hand-movement quantity of a horizontal line between a horizontal line at an immediately preceding discrete position and a horizontal line at an immediately succeeding discrete position cannot be found by carrying out an interpolation process unless the hand-movement quantity Qn of the horizontal line at the immediately preceding discrete position and the hand-movement quantity Qn+1 of the horizontal line at the immediately succeeding discrete position are found first. Thus, the hand-movement quantity of a horizontal line between the horizontal line at the immediately preceding discrete position and the horizontal line at the immediately succeeding discrete position can be found only in an interpolation process carried out at a delay time up to a period corresponding to the number of horizontal lines between the immediately preceding discrete position and the immediately succeeding discrete position.

Figures 25A, 25B, 25C:
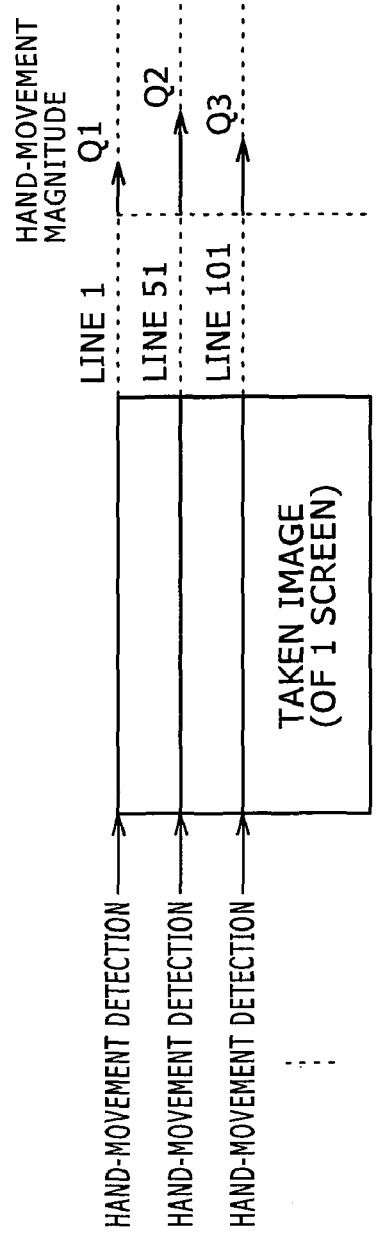
FIGS. 25A to 25C are explanatory diagrams referred to in description of a method to correct distortions caused by a hand movement as distortions in an image on the conventional CMOS imager.

In addition, if interpolation method (1) shown in FIG. 25C is adopted, it is quite within the bounds of possibility that the position of the image may be shifted because the hand-movement magnitudes used as interpolation values change.

In the case of interpolation method (2) shown in FIG. 25C, the gradient of the change in hand-movement magnitude is found from an immediately preceding hand-movement magnitude Qn and an immediately succeeding hand-movement magnitude Qn+1. Then, the gradient is multiplied by the number of horizontal lines starting with a horizontal line having the immediately preceding hand-movement magnitude Qn and ending with a horizontal line of interest to find the hand movement for the horizontal line of interest. Thus, since a multiplier is required and it is necessary to provide a register for separately setting a multiplication parameter, the scale of the circuit increases. In addition, on a border where the sampling value of the hand-movement magnitude changes, the magnitude of the hand movement does not change continuously due to a multiplication error as is obvious from the figure showing interpolation method (2) shown in FIG. 25C.

In the case of this embodiment, on the other hand, 1 screen segment is divided into a plurality of image sub-segments and, typically, for the first horizontal of each image sub-segment, the velocity of the hand movement is detected. Then, the detected velocity of the hand movement is integrated sequentially for each horizontal line in each image sub-segment in order to find the magnitude of the hand movement for each horizontal line. In the following description, the magnitude of the hand movement is referred to as a hand-movement correction quantity. At this point, the embodiment is much different from the interpolation processing described in the interpolation processing disclosed in patent document 2.

As described above, in the case of this embodiment, the hand-movement quantities (that is, the hand-movement correction quantities) for all other horizontal lines are found by integration of the hand-movement velocities found for horizontal lines at the discrete locations. Thus, the hand-movement quantities (that is, the hand-movement correction quantities) for horizontal lines can be found before the hand-movement velocity for the horizontal line at the discrete location following the horizontal line is detected unlike the method of interpolation to find the hand-movement quantities (that is, the hand-movement correction quantities) for horizontal lines on the basis of already detected hand-movement quantities for horizontal lines at two discrete locations as described in patent document 2. That is to say, in the case of this embodiment, the computation of a hand-movement quantity (that is, the hand-movement correction quantity) for a specific horizontal line can be started immediately by using an already detected hand-movement velocity for a horizontal line at a discrete location preceding the specific horizontal line.

It is to be noted that, in the case of this embodiment, in a process to extract horizontal and vertical components from a hand-movement velocity vector, opposite-sign components are each computed, being used as a correction velocity component. The signs of the velocity components and the hand-movement quantities can be inverted to generate correction velocity components or hand-movement quantities respectively at any point of time as long as the point of time precedes the start of execution of the process to correct distortions caused by hand movements as distortions in data of a taken image.

By referring to FIG. 4, the following description explains an embodiment implementing a method provided by the present invention as a method for correcting distortions of a signal representing a taken image and an embodiment implementing an apparatus adopting the method. FIG. 4 is a block diagram showing an image-taking apparatus according to an embodiment of the present invention.

As shown in FIG. 4, an incoming light beam radiated by an object of photographing by way of a camera optical system 1 including an image-taking lens 1L hits an image-taking device 2 for taking an image of the photographing object. In this embodiment, the image-taking device 2 has the configuration of a CMOS imager, which is a typical solid-state image-taking device having an X-Y address type as described earlier.

In this embodiment, the image-taking device 2 outputs an analog image-taking signal obtained as a result of fetching (or sampling) a 1-line unit at the same time indicated by a timing signal generated by a timing-signal generation section 4. Then, the output analog image-taking signal is supplied to a data conversion section 3.

The data conversion section 3 carries out a necessary correction process on the supplied analog image-taking signal and then converts a signal obtained as a result of the correction process into a digital image-taking signal synchronously with a clock signal received from the timing-signal generation section 4. The data conversion section 3 further converts the digital image-taking signal into taken-image data Din including luminance and chrominance signal components. Then, the data conversion section 3 supplies the taken-image data Din to a signal-processing section 5.

For the taken-image data Din received from the data conversion section 3, the signal-processing section 5 carries out correction processing including a process to correct distortions caused by a hand movement, and electronic zoom processing of the taken image, while controlling operations to read out data from an image memory 6 connected to the signal-processing section 5 and write data thereto in order to generate output-image data Dout at a specified resolution as an output. The electronic zoom processing is electronic processing to enlarge and shrink an image.

The signal-processing section 5 receives processing timing signals not shown in FIG. 4 from the timing-signal generation section 4. The processing timing signals include a horizontal synchronization signal H-SYNC, a vertical synchronization signal V-SYNC, a 1-pixel synchronization clock signal CLK and clock signals synchronized with these signals. The horizontal synchronization signal H-SYNC is a signal synchronized with horizontal periods of the output-image data. On the other hand, the vertical synchronization signal V-SYNC is a signal synchronized with vertical periods of the output-image data.

In addition, the image-taking apparatus includes a hand-movement velocity detection sensor 7 for detecting the velocity of a hand movement made by a photographer holding the image-taking apparatus at a photographing time. To put it in detail, the hand-movement velocity detection sensor 7 is a sensor for detecting a velocity vector of a hand movement, which is defined as a positional change made at a relatively high velocity at least equal to a predetermined velocity in the horizontal and/or vertical directions of a taken image in the image-taking device 2. The hand movement is defined as a positional change that is made at a relatively high velocity because panning operation and tilting operations carried out by the photographer as operations of the image-taking apparatus are not detected as hand movements. The panning operation of the image-taking apparatus is defined as a slow movement of the apparatus in the left or right direction, whereas the tilting operation of the image-taking apparatus is defined as a slow movement of the apparatus in the upward or downward direction.

The hand-movement velocity detection sensor 7 is typically an angular-velocity sensor provided on the case of the image-taking apparatus. A detection output generated by the hand-movement velocity detection sensor 7 is a hand-movement velocity vector. In place of the angular-velocity sensor, the hand-movement velocity detection sensor 7 can also be an acceleration sensor. In the case of an acceleration sensor, the velocity of a hand movement (or the velocity vector of the hand movement) can be found as the detection output of the hand-movement velocity detection sensor 7 by integration of the detection value generated by the acceleration sensor as an output including a direction component in addition to a magnitude component.

The detection output of the hand-movement velocity detection sensor 7 is supplied to a hand-movement velocity detection processing section 8. The hand-movement velocity detection processing section 8 also receives a sampling signal Sp from the timing-signal generation section 4. The hand-movement velocity detection processing section 8 samples the detection output (or the velocity vector or the hand movement) of the hand-movement velocity detection sensor 7 with timings indicated by the sampling signal Sp to find the 8 velocity vectors Vec_0 to Vec_7 for respectively the image sub-segments Pdiv_0 to Pdiv_7 described earlier.

Then, the hand-movement velocity detection processing section 8 splits each of the eight velocity vectors Vec_0 to Vec_7 into a component in the vertical direction and a component in the horizontal direction, generating opposite-sign components of the component in the vertical direction and the component in the horizontal direction as a vertical correction velocity component and a horizontal correction velocity component respectively. Subsequently, the hand-movement velocity detection processing section 8 supplies the vertical correction velocity component and the horizontal correction velocity component to the signal-processing section 5.

In addition, this typical image-taking apparatus has a control section 9 including a microcomputer for controlling all other components and carrying out a process to detect an inter-frame hand-movement correction quantity. As functional means implemented by software executed by the microcomputer, the control section 9 has an inter-frame hand-movement correction quantity detection section 91 and a frame-head coordinate computation section 92.

The inter-frame hand-movement correction quantity detection section 91 is a unit for integrating a hand-movement velocity output by the hand-movement velocity detection section 7 over one vertical synchronization in order to compute an inter-frame hand-movement correction quantity as described above. In this case, the sampling interval of the hand-movement velocity in the inter-frame hand-movement correction quantity detection section 91 can be equal to the sampling interval of an intra-frame hand-movement velocity described earlier. However, it is nice to have a sampling interval of the hand-movement velocity shorter than the sampling interval of an intra-frame hand-movement velocity. That is to say, at the beginning of any specific frame, by integrating a hand-movement velocity in the frame preceding the specific frame, it is possible to obtain an inter-frame hand-movement correction quantity corresponding to an image positional shift for the preceding frame.

The inter-frame hand-movement correction quantity computed by the inter-frame hand-movement correction quantity detection section 91 is passed on to the frame-head coordinate computation section 92. The frame-head coordinate computation section 92 computes the start coordinates of the frame from the inter-frame hand-movement correction quantity and supplies the computed start coordinates to the signal-processing section 5. The start coordinates are an initial x coordinate SX and an initial y coordinate SY, which will be described later.

A user interface 10 is connected to the control section 9. The user enters an image enlargement/shrinking command, a resolution input or a zoom magnification input to the user interface 10 to be passed on to the control section 9. The control section 9 generates a control signal according to the image enlargement/shrinking command, the resolution input or the zoom magnification input, supplying the generated control signal to the timing-signal generation section 4 and the signal-processing section 5.

As will be described later in detail, the signal-processing section 5 computes a vertical correction displacement SY_ADD and a horizontal correction displacement SX_ADD for each horizontal line from respectively the vertical correction velocity component and the horizontal correction velocity component, which are received from the hand-movement velocity detection processing section 8, while controlling operations to read out image data from the image memory 6 and write image data therein. Then, the hand-movement velocity detection processing section 8 uses the computed vertical correction displacement SY_ADD and the computed horizontal correction displacement SX_ADD in a process of correcting image distortions caused by a hand movement as distortions contained in taken-image data Din received from the data conversion section 3 in order to generate output image data Dout.

It is to be noted that, as described before, the signal-processing section 5 also carries out an electronic zoom process to enlarge and shrink and image and a resolution conversion process according to a standard definition, high definition or the like.

In a recording section 11, the output image data Dout generated by the signal-processing section 5 is typically subjected to a data compression process and a modulation process proper to an operation to record the data Dout onto a recording medium 12. The recording section 13 then records the compressed and modulated data onto the recording medium 12. The recording medium 12 can be a magnetic recording medium, an optical disk, a hard disk or a card memory to mention a few. Examples of the magnetic recording medium are a magnetic tape or a magnetic disk whereas an example of the optical disk is a DVD (Digital Versatile Disk). It is to be noted that the output image data Dout can also be recorded onto the recording medium 12 by way of the Internet or wireless communication means.

The output image data Dout generated by the signal-processing section 5 is also supplied to a display section serving as a monitor by way of a display-processing section 13 to be displayed as an image. An example of the display section is an LCD (Liquid Crystal Display) section. A reproduction section 14 is a unit for reproducing taken-image data recorded on the recording medium 12. The reproduction section 14 supplies the reproduced data to the display monitor by way of the display-processing section 13 to be displayed as a reproduced image.

<Processing Performed by the Control Section 9 to Compute Inter-Frame Hand-Movement Correction Quantities and Frame-Head Coordinates>

Figure 5:
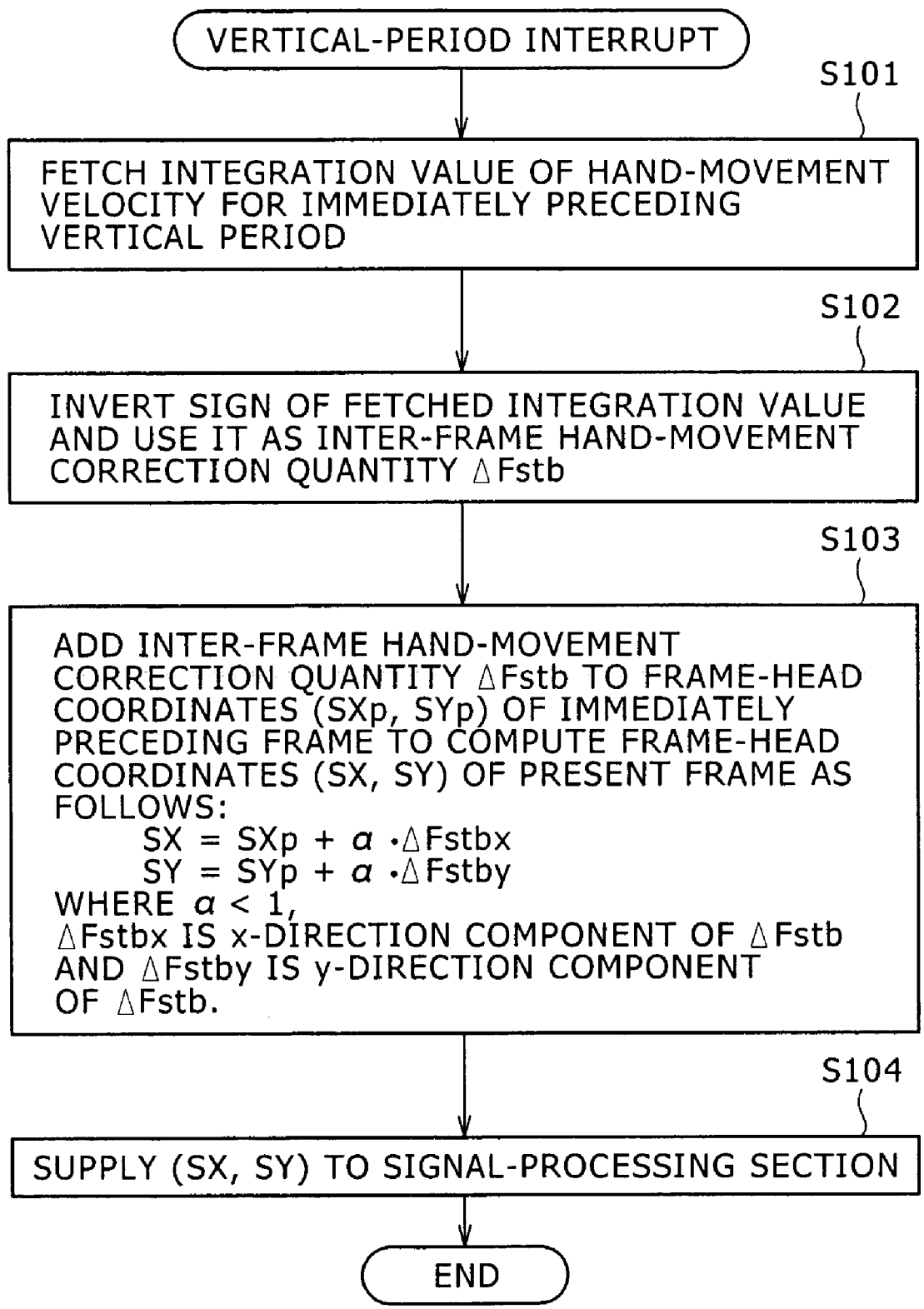
FIG. 5 shows a flowchart referred to in describing a processing procedure adopted by the principal elements to implement the method to correct distortions of a taken image in accordance with the present invention.

As described earlier, the control section 9 executes software to compute inter-frame hand-movement correction quantities and frame-head coordinates. FIG. 5 shows a flowchart representing the processing to compute inter-frame hand-movement correction quantities and frame-head coordinates.

The microcomputer serving as the control section 9 integrates a hand-movement velocity output by the hand-movement velocity detection section 7 over each vertical synchronization period and, with a sampling timing synchronized to the vertical synchronization signal V-SYNC, an interrupt is generated to start the processing to compute inter-frame hand-movement correction quantities and frame-head coordinates in accordance with the flowchart shown in FIG. 5. The flowchart begins with a step S101 to acquire an integration value obtained for the immediately preceding vertical period as an integration value for the velocity of a hand movement.

Then, in a process carried out at the next step S102, a value with the same magnitude as that of the acquired integration value and a sign opposite to that of the fetched integration value is taken as an inter-frame hand-movement correction quantity $\Delta Fstb$. Subsequently, in a process carried out at the next step S103, the head coordinates (SX, SY) of the next frame are computed by adding an offset value computed on the basis of the inter-frame hand-movement correction quantity $\Delta Fstb$ as an offset value of the head coordinates of a frame to the head coordinates (SXp, SYp) of an image taken at a time leading ahead of the present time by one frame.

The process carried out at the above step to compute the head coordinates (SX, SY) of the next frame can be represented by the equations (1) and (2) as follows:

$$SX = SXp + \alpha * \Delta Fstbx \quad (1)$$

$$SY = SYp + \alpha * \Delta Fstby \quad (2)$$

In the above equations, notation $\alpha$ denotes an adjustment coefficient having a value smaller than 1, that is, $\alpha < 1$. In addition, notation $\Delta Fstbx$ denotes the horizontal-direction (x direction) component of the inter-frame hand-movement correction quantity $\Delta Fstb$ whereas notation $\Delta Fstby$ denotes the vertical-direction (y direction) component of the inter-frame hand-movement correction quantity $\Delta Fstb$.

The adjustment coefficient $\alpha$ is a coefficient having such a value that, when a partial image is extracted from the taken-image frame AFL of the image-taking device, a cut-out frame EFL containing the partial image is cut out from the center of the taken-image frame AFL.

Figure 6A:
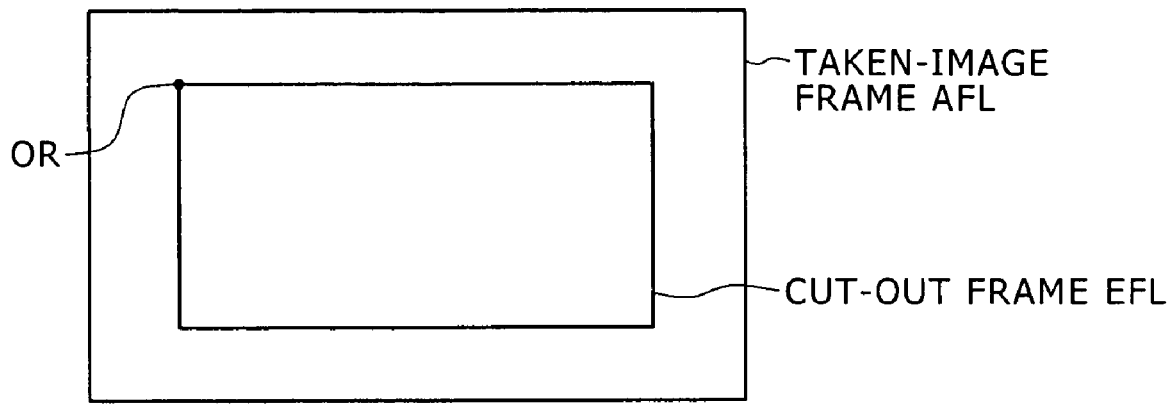
FIGS. 6A and 6B are explanatory diagrams referred to in describing processing carried out by the principal elements to implement the method to correct distortions of a taken image in accordance with the present invention.

That is to say, as shown in FIG. 6A, initially, the frame head coordinates (SX, SY) are set at the origin coordinates OR so that the cut-out frame EFL is placed at the center of the taken-image frame AFL. As a process to correct an inter-frame hand movement shifts the frame head coordinates (SX, SY), the cut-out frame EFL changes as shown in FIG. 6B.

If the inter-frame hand-movement correction quantity $\Delta Fstb$ is used as it is, the cut-out frame EFL is cut out from a location closer to a side of the taken-image frame AFL. In particular, if a large inter-frame hand-movement correction quantity $\Delta Fstb$ is used, the cut-out frame EFL is cut out from a location much closer to a side of the taken-image frame AFL. In this case, it is no longer possible to cope with a hand movement made in the direction toward the side.

In order to solve the above problem, in this embodiment, the adjustment coefficient $\alpha$ is set at a value smaller than 1. By multiplying the adjustment coefficient $\alpha$ by the inter-frame hand-movement correction quantity $\Delta Fstb$, the cut-out frame EFL can be placed at the center of the taken-image frame AFL even if the hand-movement correction effect must be sacrificed to a certain degree so that the inter-frame hand-movement correction effect can be assured.

Figure 6B:
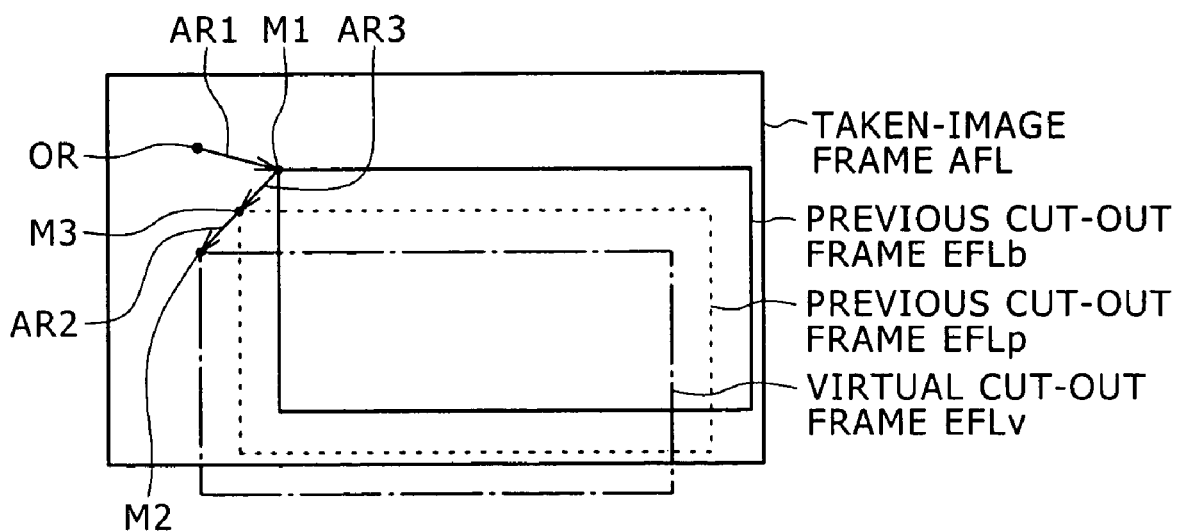

Next, by referring to FIG. 6B, a processing effect of the adjustment coefficient $\alpha$ is explained. For a frame hand-movement correction quantity found for the taken image of the immediately preceding frame, first of all, the frame-head coordinates of the immediately preceding frame are moved to coordinates M1 shifted from the origin coordinates OR as shown by an arrow AR1 to result in a frame EFLb shown by a solid line as the cut-out frame.

Then, the inter-frame hand-movement correction quantity $\Delta Fstb$ for the immediately preceding frame is computed and a cut-out frame according to the inter-frame hand-movement correction quantity $\Delta Fstb$ itself is set. As a result, the frame-head coordinates of the present frame, that is, the frame-head coordinates of a frame to be cut out, are set at coordinates M2 shifted as indicated by an arrow AR2 shown in FIG. 6B.

The cut-out frame of the present frame having the coordinates M2 as the frame-head coordinates is a frame EFLv shown by a dotted line in FIG. 6B as a frame partially shifted out to the outside of the taken-image frame AFL. The portion outside the taken-image frame AFL can be generated only by processing such as a data interpolation process.

In the case of this embodiment, however, the inter-frame hand-movement correction quantity ΔFstb of the immediately preceding frame is multiplied by the adjustment coefficient a to determine the frame-head coordinates of the present frame from the frame-head coordinates of the immediately preceding frame. Thus, for the arrow AR2, a shift between the immediately preceding frame and the present frame is indicated by an arrow AR3. As a result, coordinates M3 are obtained as the frame-head coordinates of the present frame and a frame EFLp shifted to the inside of the taken-image frame AFL as shown by a dashed line is obtained as the cut-out frame.

It is to be noted that, in accordance with the above description, the inter-frame hand-movement correction quantity ΔFstb of the immediately preceding frame is always multiplied by a predetermined adjustment coefficient α to determine the frame-head coordinates of the present frame from the frame-head coordinates of the immediately preceding frame. Since the frame-head coordinates of the immediately preceding frame are always known, if a cut-out frame EFLv is partially shifted out to the outside of the taken-image frame AFL in a process to set the cut-out frame EFLv by using the inter-frame hand-movement correction quantity ΔFstb for the present frame, the inter-frame hand-movement correction quantity ΔFstb may be multiplied by a predetermined adjustment coefficient α.

In addition, as described above, the inter-frame hand-movement correction quantity ΔFstb of the immediately preceding frame is always multiplied by a predetermined adjustment coefficient α, which may be changed in accordance with the frame-head coordinates of the immediately preceding frame. That is to say, if the differences between the frame-head coordinates of the immediately preceding frame and the origin coordinates OR are large, the predetermined adjustment coefficient α can be increased to take the cut-out frame at the center of the taken-image frame AFL.

The frame-head coordinates (SX, SY) obtained as described above as the coordinates of the present frame are supplied from the control section 9 to the signal-processing section 5.

<Detailed Typical Configuration for Correcting Intra-Frame Hand Movements>

Figure 7:
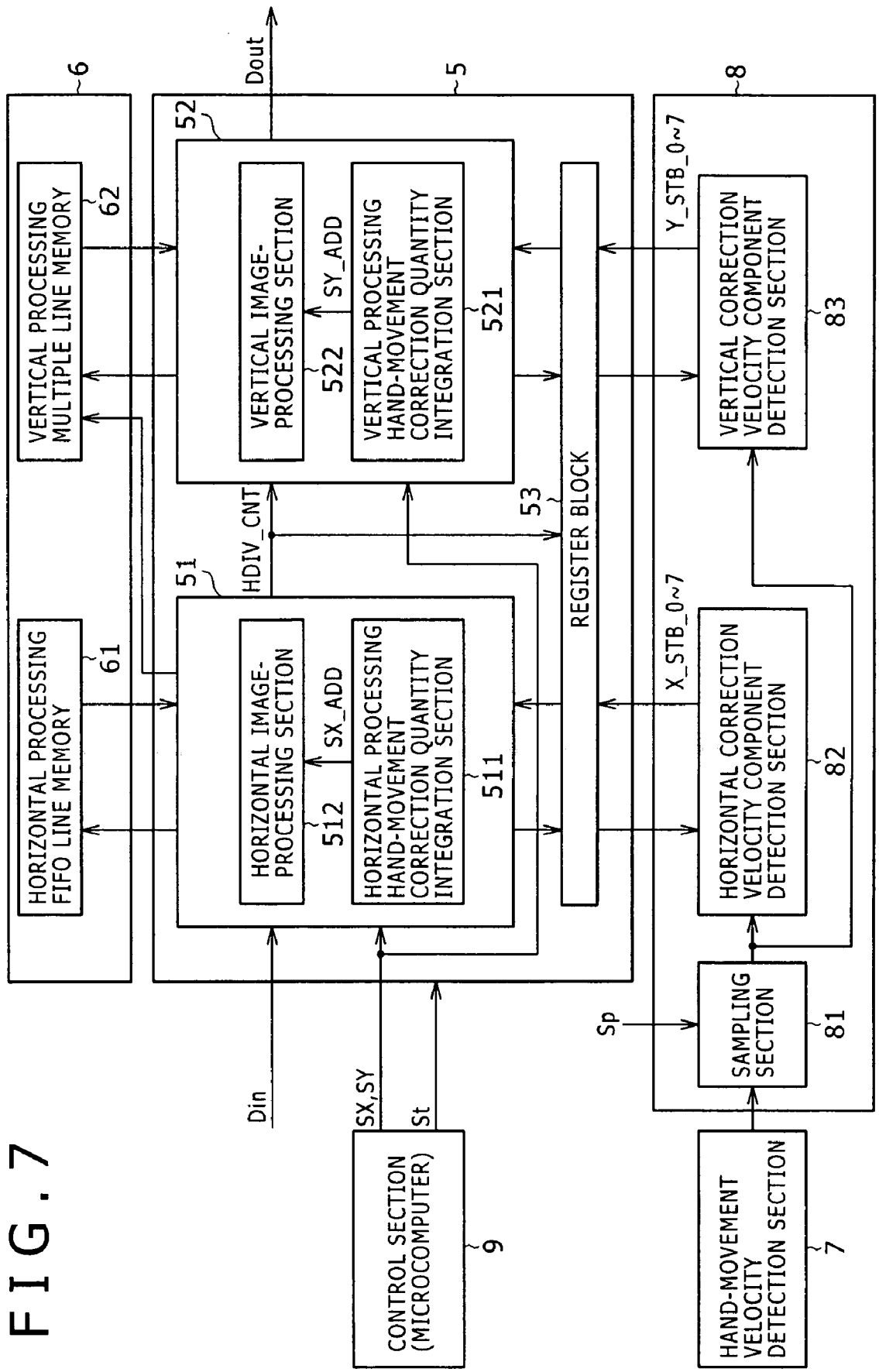
FIG. 7 is a block diagram showing a typical detailed configuration of a portion of the typical configuration shown in FIG. 4.

Next, more detailed configurations of the signal-processing section 5, the image memory 6 and the hand-movement velocity detection processing section 8, which are employed in the image-taking apparatus shown in FIG. 4, are described by referring to FIG. 7.

Used as a unit for carrying out a process to correct distortions caused by a hand movement, an electronic zoom process and a process to generate output data, the signal-processing section 5 includes a horizontal processing block 51, a vertical processing block 52 and a register block 53. The horizontal processing block 51 has a horizontal processing hand-movement correction quantity integration section 511 and a horizontal image-processing section 512 whereas the vertical processing block 52 includes a vertical processing hand-movement correction quantity integration section 521 and a vertical image-processing section 522.

The horizontal processing block 51 is a unit for carrying out processing in the horizontal direction on the taken-image data Din received from the data conversion section 3. The processing in the horizontal direction includes a process to correct distortions caused by a hand movement as distortions oriented in the horizontal direction. On the other hand, the vertical processing block 52 is a unit for carrying out processing in the vertical direction on the taken-image data Din received from the data conversion section 3. The processing in the vertical direction includes a process to correct distortions caused by a hand movement as distortions oriented in the vertical direction. The register block 53 is a unit for carrying out a process to pass on information on hand-movement velocities detected by the hand-movement velocity detection processing section 8 to the horizontal processing block 51 and the vertical processing block 52.

The hand-movement velocity detection processing section 8 has a velocity-sampling section 81, a horizontal correction velocity component detection section 82 and a vertical correction velocity component detection section 83.

Figure 8:
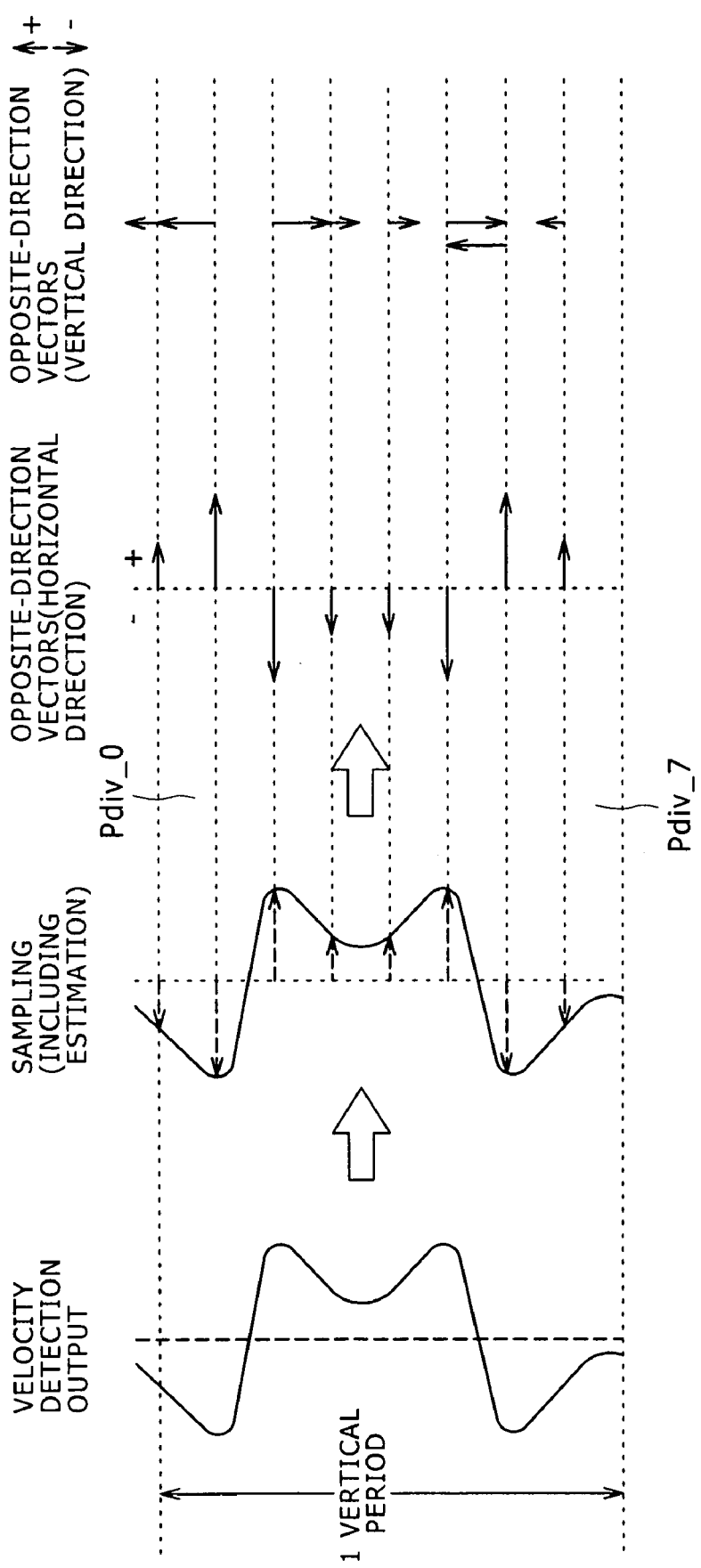
FIGS. 8A to 8D are explanatory diagrams referred to in describing operations carried out by the principal elements of the outline of an embodiment implementing a method to correct distortions of a taken image in accordance with the present invention.

The velocity-sampling section 81 is a unit for obtaining the hand-movement velocity vectors Vec_0 to Vec_7 shown in FIG. 8B for the image sub-segments Pdiv_0 to Pdiv_7 respectively by sampling a hand-movement velocity detection output, which is produced by the hand-movement velocity detection sensor 7 as shown in FIG. 8A, with timings indicated by the sampling signal Sp generated by the timing-signal generation section 4. In this embodiment, the velocity-sampling section 81 obtains the hand-movement velocity vectors Vec_0 to Vec_7 for the image sub-segments Pdiv_0 to Pdiv_7 respectively by sampling the hand-movement velocity detection output at intervals each equal to ⅛ of the vertical period at sampling timings corresponding to the first horizontal lines of the image sub-segments Pdiv_0 to Pdiv_7.

In this case, the value of each hand-movement velocity vector to be obtained is not a value at a sampling time of a horizontal line for taken-image data fetched from the image-taking device 2. This is because, as described before, every pixel on the image-taking device 2 has an exposure time. Thus, an image-taking signal fetched from the image-taking device 2 for a horizontal line is an average value over the exposure time duration going back to the past starting from the sampling time of the horizontal line. In this case, the taken-image data fetched from the image-taking device 2 is the luminance value of a signal leaving a color filter.

Figure 9:
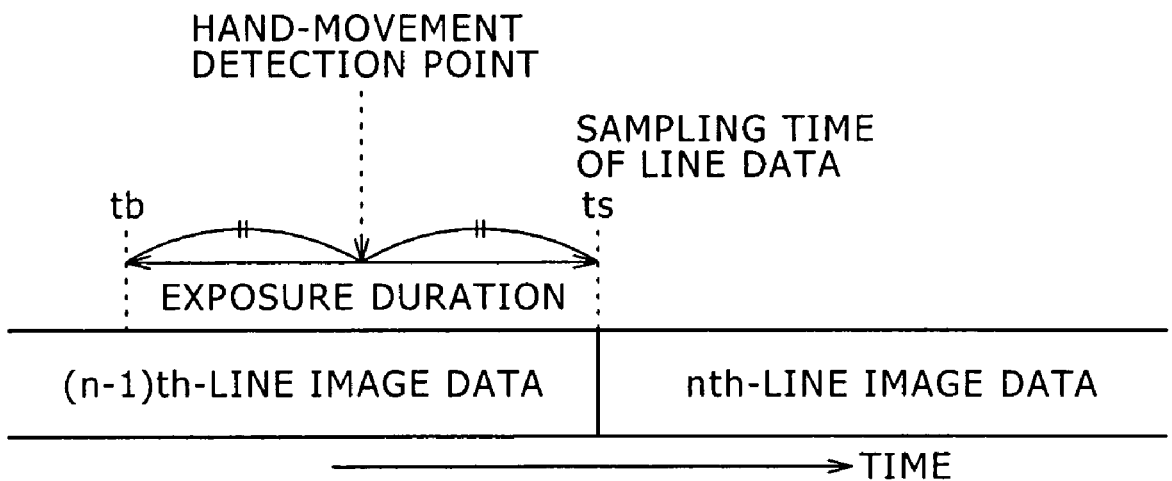
FIG. 9 is an explanatory diagram referred to in describing operations carried out by the principal elements of the outline of an embodiment implementing a method to correct distortions of a taken image in accordance with the present invention.

Thus, in this embodiment, a sampling time according to the sampling signal Sp is set at a time in the exact middle between a sampling time ts of image data of a horizontal line and a time tb as shown in FIG. 9. As shown in the figure, the time tb is a time preceding the sampling time ts by the exposure time duration cited above.

In the case of a short exposure time duration, with a timing of the beginning of image data for a horizontal line, the value of the hand-movement velocity vector can be confirmed. If the exposure time duration becomes shorter, however, with a timing of the beginning of image data for a horizontal line, the value of the hand-movement velocity vector can no longer be confirmed in some cases. In such cases, the velocity-sampling section 81 refers to hand-movement velocity vectors obtained in the past to estimate the value of the present hand-movement velocity vector.

The eight hand-movement velocity vectors Vec_0 to Vec_7 obtained as a result of a sampling process carried out by the velocity-sampling section 81 for one frame or one vertical period are supplied to the horizontal correction velocity component detection section 82 and the vertical correction velocity component detection section 83.

The horizontal correction velocity component detection section 82 extracts the horizontal-direction components of the hand-movement velocity vectors Vec_0 to Vec_7 for the image sub-segments Pdiv_0 to Pdiv_7 respectively and finds the horizontal correction velocity components X_STB_0 to X_STB_7 shown in FIG. 8C as components having signs opposite to the horizontal-direction components of the hand-movement velocity vectors Vec_0 to Vec_7 respectively.

By the same token, the vertical correction velocity component detection section 83 extracts the vertical-direction components of the hand-movement velocity vectors Vec_0 to Vec_7 for the image sub-segments Pdiv_0 to Pdiv_7 respectively and finds the vertical correction velocity components Y_STB_0 to Y_STB_7 shown in FIG. 8D as components having signs opposite to the vertical-direction components of the hand-movement velocity vectors Vec_0 to Vec_7 respectively.

In this case, in this embodiment, the horizontal correction velocity components X_STB_0 to X_STB_7 and the vertical correction velocity components Y_STB_0 to Y_STB_7 are each found as hand-movement correction quantity per time length corresponding to one horizontal line segment.

That is to say, the horizontal correction velocity components X_STB_0 to X_STB_7, which are denoted by generic symbol X_STB, are used as X_STB (=the horizontal hand-movement correction quantity/the duration of one horizontal line segment).

On the other hand, the vertical correction velocity components Y_STB_0 to Y_STB_7, which are denoted by generic symbol Y_STB, are used as Y_STB (=the vertical hand-movement correction quantity/the duration of one horizontal line segment).

The horizontal correction velocity components X_STB_0 to X_STB_7 are each represented by a multiple of a pixel pitch (or inter-pixel gap) dx in the horizontal direction. In this case, the fraction part following the decimal point is truncated to give the multiple. The truncation of the fraction part is applied to values described as follows. In other words, the horizontal correction velocity components X_STB_0 to X_STB_7 are each represented by the number of pixels laid out in the horizontal direction. This number of pixels is a value obtained by truncation of its fraction part.

By the same token, the vertical correction velocity components Y_STB_0 to Y_STB_7 are each represented by a multiple of a pixel pitch (or inter-pixel gap) dy in the vertical direction. In this case, the fraction part following the decimal point is truncated from the multiple. As described above, the truncation of the fraction part is applied to values described as follows. In other words, the vertical correction velocity components Y_STB_0 to Y_STB_7 are each represented by the number of pixels laid out in the vertical direction. This number of pixels is a value obtained by truncation of its fraction part.

In the implementation of the representation described above, for the horizontal-direction and vertical-direction velocity components of the hand-movement velocity output generated by the velocity-sampling section 81, a table associating velocity components with pixel counts each obtained by truncating its fraction part is prepared. As described above, the truncation of the fraction part is applied to values described as follows. The table is used for obtaining the number of pixels (or a pixel count) for a given velocity component corresponding to the number of pixels. Then, signs opposite to the signs of the horizontal-direction velocity components of the hand movement are attached to the pixel counts obtained for the horizontal-direction velocity components to give the horizontal correction velocity components X_STB_0 to X_STB_7. By the same token, signs opposite to the signs of the vertical-direction velocity components of the hand movement are attached to the pixel counts obtained for the vertical-direction velocity components to give the vertical correction velocity components Y_STB_0 to Y_STB_7.

In this embodiment, by determining the values of the horizontal correction velocity components X_STB_0 to X_STB_7 and the vertical correction velocity components Y_STB_0 to Y_STB_7, an integration process carried out as described later to compute a horizontal hand-movement correction quantity SX_ADD and a vertical hand-movement correction quantity SY_ADD can be implemented as a simple cumulative addition process to find a sum of horizontal correction velocity components and a sum of vertical correction velocity components respectively.

Then, the horizontal correction velocity components X_STB_0 to X_STB_7 computed by the horizontal correction velocity component detection section 82 and the vertical correction velocity components Y_STB_0 to Y_STB_7 computed by the vertical correction velocity component detection section 83 are supplied sequentially to IF (interface) registers of the register block 53 employed in the signal-processing section 5 with timings determined by a timing signal St generated by the timing-signal generation section 4. The IF registers themselves are shown in none of the figures.

With a process timing of the horizontal processing block 51, the horizontal correction velocity components X_STB_0 to X_STB_7 are transferred from the IF register to a horizontal-processing block register employed in the register block 53. This process timing is different from the timing determined by the timing signal St. The horizontal-processing block register employed in the register block 53 is also shown in none of the figures.

By the same token, with a process timing of the vertical processing block 52, the vertical correction velocity components Y_STB_0 to Y_STB_7 are transferred from the IF register to a vertical-processing block register employed in the register block 53. This process timing is also different from the timing determined by the timing signal St. The vertical-processing block register employed in the register block 53 is also shown in none of the figures.

The horizontal processing hand-movement correction quantity integration section 511 employed in the horizontal processing block 51 integrates the horizontal correction velocity components X_STB_0 to X_STB_7 stored in the horizontal-processing block register employed in the register block 53 as the horizontal correction velocity components for the image sub-segments Pdiv_0 to Pdiv_7 respectively to produce horizontal hand-movement correction quantities SX_ADD for horizontal lines in the image sub-segments Pdiv_0 to Pdiv_7 respectively.

By the same token, the vertical processing hand-movement correction quantity integration section 521 employed in the vertical processing block 52 integrates the vertical correction velocity components Y_STB_0 to Y_STB_7 stored in the vertical-processing block register employed in the register block 53 as the vertical correction velocity components for the image sub-segments Pdiv_0 to Pdiv_7 respectively to produce vertical hand-movement correction quantities SY_ADD for horizontal lines in the image sub-segments Pdiv_0 to Pdiv_7 respectively.

The horizontal image-processing section 512 employed in the horizontal processing block 51 corrects hand-movement components in the horizontal direction by using the horizontal hand-movement correction quantities SX_ADD computed by the horizontal processing hand-movement correction quantity integration section 511 while reading out image data from the image memory 6 and writing image data thereto.

By the same token, the vertical image-processing section 522 employed in the vertical processing block 52 corrects hand-movement components in the vertical direction by using the vertical hand-movement correction quantities SY_ADD computed by the vertical processing hand-movement correction quantity integration section 521 while reading out image data from the image memory 6 and writing image data thereto.

In this embodiment, the image memory 6 includes a horizontal-processing FIFO line memory 61 and a vertical-processing small-scale line memory 62. In the case of this embodiment, the horizontal-processing FIFO line memory 61 has a storage capacity for accommodating data of one horizontal line. On the other hand, the vertical-processing small-scale line memory 62 has a storage capacity for accommodating data of as many horizontal lines as taps of a FIR (Finite Impulse Response) filter for a vertical-direction interpolation process to be described later.

The horizontal image-processing section 512 employed in the horizontal processing block 51 includes a FIFO memory controller for controlling operations to read out data from the horizontal-processing FIFO line memory 61 and write data thereto and a horizontal-direction interpolation process section for carrying out an interpolation process by assuming a case in which the computed horizontal hand-movement correction quantities SX_ADD each have a fraction part following the decimal point. In this assumed case, the post-correction pixel position is displaced from the pixel position in the horizontal direction by an offset. Both the FIFO memory controller and the horizontal-direction interpolation process section are not shown in FIG. 7. In the case of this embodiment, as the horizontal-direction interpolation process section, a horizontal-direction digital FIR filter is used as will be described later. The horizontal-direction digital FIR filter is referred to hereafter simply as a horizontal FIR filter.

By the same token, the vertical image-processing section 522 employed in the vertical processing block 52 includes a memory controller for controlling operations to read out data from the vertical-processing small-scale line memory 62 and write data thereto and a vertical-direction interpolation process section for carrying out an interpolation process by assuming a case in which the computed vertical hand-movement correction quantities SY_ADD each have a fraction part following the decimal point. In this assumed case, the post-correction pixel position is displaced from the pixel position in the vertical direction by an offset. Both the memory controller and the vertical-direction interpolation process section are not shown in FIG. 7. In the case of this embodiment, as the vertical-direction interpolation process section, a vertical-direction digital FIR filter is used as will be described later. The vertical-direction digital FIR filter is referred to hereafter simply as a vertical FIR filter.

The following description explains an interpolation process for a case in which the computed horizontal hand-movement correction quantity SX_ADD and/or the computed vertical hand-movement correction quantity SY_ADD each have a fraction part following their decimal points.

Figure 10:
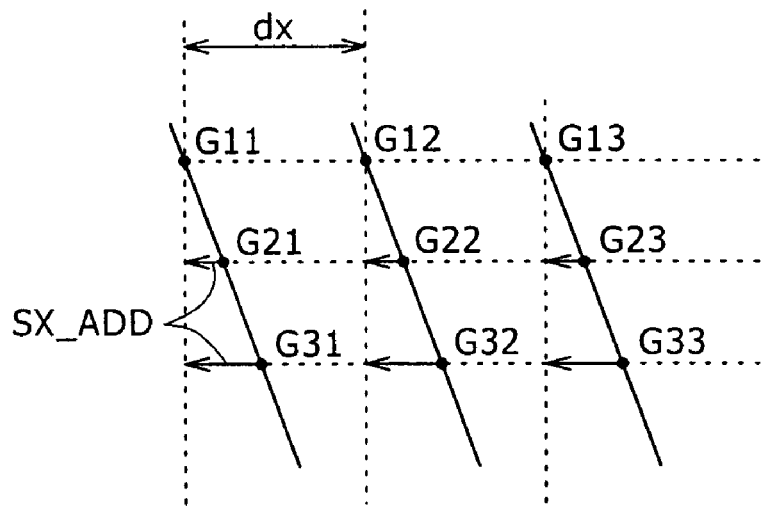
FIG. 10 is an explanatory diagram referred to in describing an interpolation process carried out in processing to correct distortions of a taken image in an embodiment implementing a method to correct the image distortions in accordance with the present invention.

Let us assume for example a case in which image distortions like ones shown in FIG. 10 are generated in the horizontal direction due to horizontal-direction velocity components caused by a hand movement. That is to say, in the example shown in FIG. 10, if there is no hand movement, pixels G11, G21, G31 and so on, pixels G12, G22, G32 and so on as well as pixels G13, G23, G33 and so on are naturally placed at positions shown by dashed lines. When a hand movement is introduced, however, the pixels G11, G21, G31 and so on, the pixels G12, G22, G32 and so on as well as the pixels G13, G23, G33 and so on are displaced to positions shown by inclined solid lines due to the horizontal-direction velocity components of the hand movement.

In order to correct the distortions caused by the hand movement, the shifted positions need to be restored to the original positions. The magnitudes of the shifts are equal to the computed horizontal hand-movement correction quantities SX_ADD described above as shown in FIG. 10. If each of the computed horizontal hand-movement correction quantities SX_ADD is equal to a multiple of the pixel pitch dx, it is possible to correct the distortion caused by the hand movement by merely reading out pixel data from locations shifted back from the displaced locations by the computed horizontal hand-movement correction quantity SX_ADD, which is equal to the multiple of the pixel pitch dx.

If each of the computed horizontal hand-movement correction quantities SX_ADD is not equal to a multiple of the pixel pitch dx, that is, if each of the computed horizontal hand-movement correction quantities SX_ADD includes a partial shift distance corresponding to a fraction following the decimal point, however, the partial shift distance does not correspond to a position at which pixel data actually exists. It is thus necessary to generate pixel data from a specific pixel location shifted back from the displaced location by a distance corresponding to the horizontal hand-movement correction quantity SX_ADD by carrying out an interpolation process based on a plurality of pieces of pixel data existing at pixel locations close to the specific pixel location.

Figure 11:
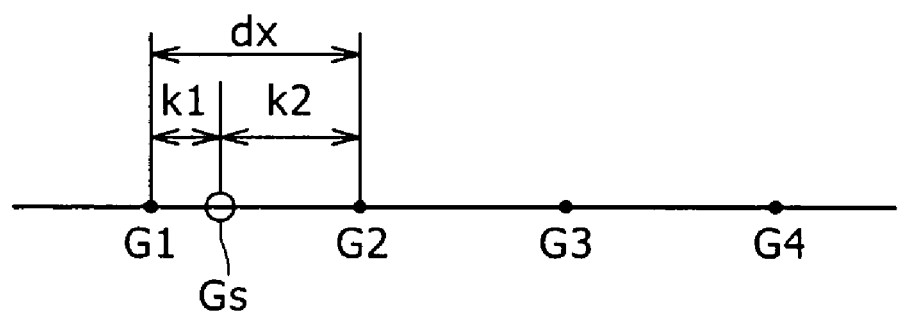
FIG. 11 is an explanatory diagram referred to in describing an interpolation process carried out in processing to correct distortions of a taken image in an embodiment implementing a method to correct the image distortions in accordance with the present invention.

FIG. 11 is a diagram showing a typical interpolation method. In accordance with this interpolation method, the pixel data of an interpolation pixel Gs between pixels G1 and G2 is found as follows:

Data of $Gs = W \times$ data of $G1 + (1-W) \times$ data of $G2$ where notation W in the above equation satisfies the following equation:

$k1/k2 = W/(1-W)$ where notation k1 in the above equation denotes the distance between the interpolation pixel Gs and the pixel G1 whereas notation k2 denotes the distance between the interpolation pixel Gs and the pixel G2.

In the example shown in FIG. 11, pieces of data for two pixels are used. In another example shown in FIG. 12, pixel data of more than two pixels is used. To be more specific, pieces of data for four pixels G0, G1, G2 and G3 shown in FIG. 12 are used in the interpolation process to find pixel data of the interpolation pixel Gs as follows:

Data of $Gs = W0 \times$ data of $G0 + W1 \times$ data of $G1 + W2 \times$ data of $G2 + W3 \times$ data of $G3$ where notations W0, W1, W2 and W3 in the above equation denote multiplication coefficients satisfying the following equations:

$W0 = (k1+k2+k3)/(3*(k0+k1+k2+k3))$ $W1 = (k0+k2+k3)/(3*(k0+k1+k2+k3))$ $W2 = (k0+k1+k3)/(3*(k0+k1+k2+k3))$ $W3 = (k0+k1+k2)/(3*(k0+k1+k2+k3))$ where notations k0, k1, k2 and k3 in the above equations denote the distances ds between G0 and Gs, between G1 and Gs, between G2 and Gs and between G3 and Gs respectively.

Figure 12:
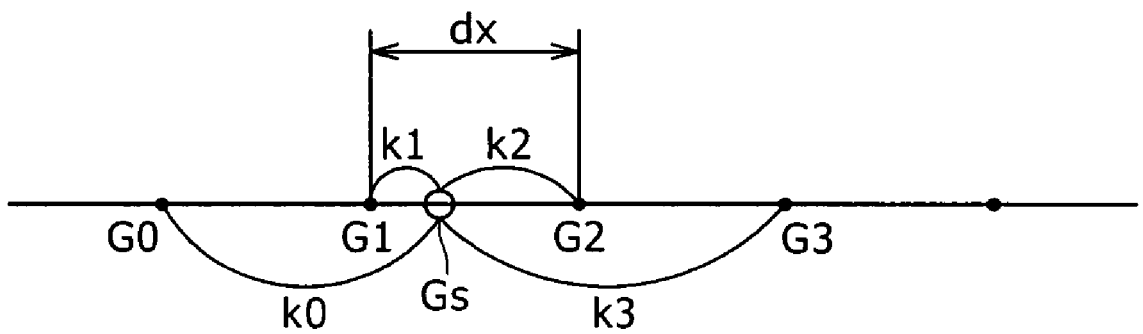
FIG. 12 is an explanatory diagram referred to in describing an interpolation process carried out in processing to correct distortions of a taken image in an embodiment implementing a method to correct the image distortions in accordance with the present invention.

As is obvious from the above description, in the case of the example shown in FIG. 12 wherein four pixels G0, G1, G2 and G3 are used as a base of the interpolation process, the multiplication coefficients W0, W1, W2 and W3 are determined by the distances ds between the interpolation pixel Gs and the four pixels G0, G1, G2 and G3. Relations between the multiplication coefficients W0, W1, W2 and W3 and the distances ds between the interpolation pixel Gs and the four pixels G0, G1, G2 and G3 can be stored in a table in advance to be read out later in the interpolation process. It is to be noted that the distance ds can be represented only by the fractional part following the decimal point of the horizontal hand-movement correction quantity SX_ADD.

The interpolation process according to this embodiment is carried out by using a horizontal FIR filter. That is to say, a set of multiplication coefficients corresponding to the fractional part following the decimal point of a horizontal hand-movement correction quantity SX_ADD is read out from the table and supplied to the horizontal FIR filter to be used in the interpolation process described above.

The interpolation process in the horizontal direction has been described above. An interpolation process in the vertical direction is exactly the same as the interpolation process in the horizontal direction except that, in the case of the interpolation process in the vertical direction, the interpolation direction is vertical.

<Processes Carried Out by the Horizontal Processing Block 51>

<Integration Processing to Compute the Horizontal Hand-Movement Correction Quantity SX_ADD>

Figure 13:
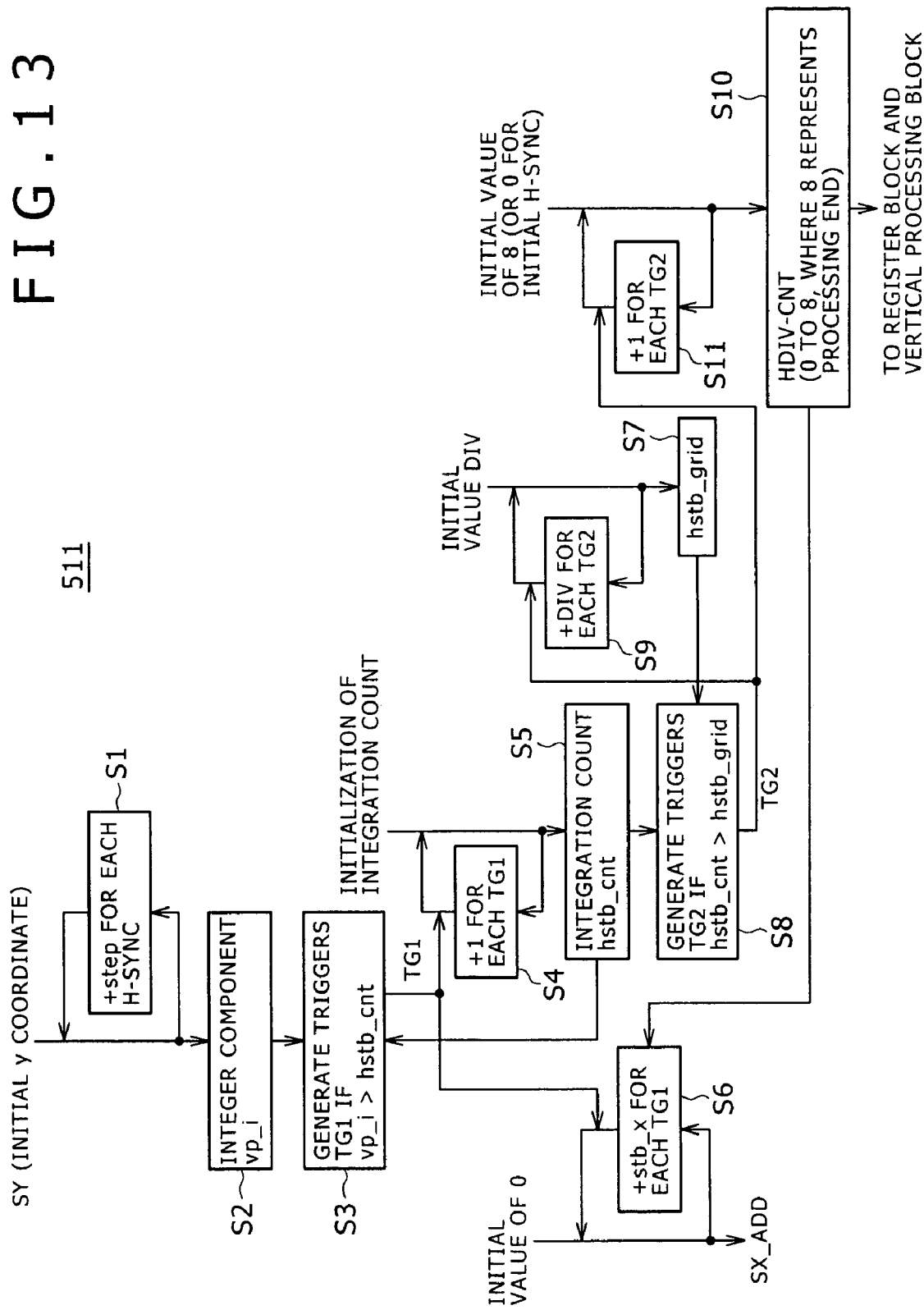
FIG. 13 shows a flowchart referred to in explaining flows of operations carried out by a horizontal hand-movement correction quantity integration section employed in the embodiment shown in FIG. 3 as an embodiment implementing an apparatus for correcting distortions of a taken image.

FIG. 13 shows a flowchart representing integration processing carried out by the horizontal processing hand-movement correction quantity integration section 511 to compute a horizontal hand-movement correction quantity SX_ADD as a result of integration.

First of all, at a step S1, a value 'step' is added cumulatively to an initial y coordinate SY generated by the control section 9, which corresponds to the position of a horizontal line, every horizontal synchronization signal H-SYNC. In this case, the horizontal synchronization signal H-SYNC means a timing signal selected among general horizontal scanning signals as a timing signal masking areas other than the valid image area.

The initial y coordinate SY represents a position in the coordinate system of all pixels on the CMOS imager as a position at which the first horizontal line of an output image is located. In general, the initial y coordinate SY is not '0'.

This is because, in the case of a moving picture, normally, data of all pixels on the CMOS imager is not supplied right away to the signal-processing section 5. Instead, the data of all pixels on the CMOS imager is supplied to the signal-processing section 5 after being summed up in the vertical direction inside the CMOS imager to find an average, which is then supplied to the signal-processing section 5 at a stage following the summing-up process. This is also because, after the data of all pixels on the CMOS imager is supplied to the signal-processing section 5, the data is subjected to some processes. For these reasons, the absolute coordinate of the first horizontal line is not '0' in many cases. In addition, if the input image data is subjected to a partial enlargement process of the vertical direction, the initial y coordinate SY represents the position of a horizontal line in about the middle of the screen. Thus, the initial y coordinate SY may have a very large value.

The value 'step' added cumulatively to the initial y coordinate SY every horizontal synchronization signal H-SYNC in a process carried out at the step S1 represents an increment of the vertical coordinate in the absolute coordinate system of the gaps between horizontal lines. It is quite within the bounds of possibility that the value 'step' is 2 or 4 besides 1 as determined by an averaging summation process carried out on image data of a plurality of horizontal lines laid out in the vertical direction inside the CMOS imager described above or at a stage preceding the horizontal processing block.

The value 'step' is added cumulatively to the initial y coordinate SY every horizontal synchronization signal H-SYNC in a process carried out at the step S1 to find the absolute coordinate of a horizontal line currently being processed. Then, in a process carried out at the next step S2, the integer part vp_i of the absolute coordinate is extracted. The integer part vp_i of the absolute coordinate represents the number of times the horizontal correction velocity component X_STB_* should be subjected to an integration process up to the present time. In this case and the following description, notation * denotes an integer in the range 0 to 7. That is to say, the horizontal correction velocity component X_STB_* represents any of the horizontal correction velocity components X_STB_0 to X_STB_7. The number of times the horizontal correction velocity component X_STB_* should be subjected to an integration process is referred to hereafter as an integration count, which is an integration value in one screen.

Then, in a process carried out at the next step S3, the integer part vp_i of the absolute coordinate of the horizontal line being processed is compared with an integration count hstb_cnt up to a horizontal line immediately preceding the horizontal line being processed. The horizontal line being processed is referred to hereafter as a presently processed line. The integration count hstb_cnt up to a horizontal line immediately preceding the presently processed line is the number of times the integration process has been carried out on horizontal lines up to the horizontal line immediately preceding the presently processed line. The difference between the integer part vp_i of the absolute coordinate of the presently processed line and the integration count hstb_cnt up indicates how many times the integration process is to be carried out on the presently processed line. Thus, in the process carried out at the step S3, a trigger TG1 is generated every processing unit cycle as many times as the difference between the integer part vp_i of the absolute coordinate of the presently processed line and the integration count hstb_cnt. The processing unit cycle is much shorter than one horizontal period.

Then, in a process carried out at the next steps S4 and S5, each time the trigger TG1 is generated, the integration count hstb_cnt is incremented by 1.

Subsequently, in a process carried out at the next step S6, a horizontal correction velocity component X_STB_* selected from the horizontal correction velocity components X_STB_0 to X_STB_7 as a horizontal correction velocity component for an image sub-segment including the presently processed line is integrated every trigger TG1 in an integration process to produce a horizontal hand-movement correction quantity SX_ADD. Notation stb_x shown in a block S6 of the flowchart shown in FIG. 13 denotes the horizontal correction velocity component X_STB_* selected from the horizontal correction velocity components X_STB_0 to X_STB_7. That is to say, stb_x is the magnitude of a horizontal correction velocity component for an image sub-segment including the presently processed line.

If the value 'step' added cumulatively to the initial y coordinate SY every horizontal synchronization signal H-SYNC in a process carried out at the step S1 is equal to 1 and a normal output process other than, for example, a process to enlarge the image is carried out, the trigger TG1 is generated every horizontal synchronization signal H-SYNC. Thus, in the process carried out at the step S6, stb_x is cumulatively added (or integrated) for each horizontal line.

The horizontal hand-movement correction quantity SX_ADD obtained as a result of such an integration process is a correction quantity used for correcting a read start position of every horizontal line on the CMOS imager as described above. That is to say, the horizontal hand-movement correction quantity SX_ADD obtained as a result of such an integration process is no other than the horizontal initial position of every horizontal line in a process carried out by the horizontal processing block 51 to correct image distortions generated in the horizontal direction. The horizontal initial position of every horizontal line is also referred to as a horizontal offset.

As described above, in the process carried out at the step S6, a horizontal correction velocity component X_STB_* must be selected from the horizontal correction velocity components X_STB_0 to X_STB_7 as a horizontal correction velocity component for an image sub-segment including the presently processed line. The image sub-segment is a result of dividing one screen by 8 in the vertical direction. The divided screen is also referred to as one frame corresponding to one vertical synchronization period. A process to select a horizontal correction velocity component X_STB * from the horizontal correction velocity components X_STB_0 to X_STB_7 as a horizontal correction velocity component corresponding to an image sub-segment including the presently processed line is carried out in the remaining part of the processing represented by the flowchart shown in FIG. 13.

In this example, a cumulative value hstb_grid of the line count, which is the number of horizontal lines in image sub-segments, is defined in a process carried out at a step S7. The initial value of the cumulative value hstb_grid is DIV, which is the number of horizontal lines in any one of the image sub-segments.

Then, in a process carried out at the next step S8, the cumulative value hstb_grid is compared with the integration count hstb_cnt and a trigger TG2 is generated every time the integration count hstb_cnt exceeds the cumulative value hstb_grid. Subsequently, in a process carried out at the next step S9, DIV representing the number of horizontal lines in any one of the image sub-segments is added cumulatively to the cumulative value hstb_grid every time the trigger TG2 is generated.

By carrying out the processes described above, each time the processing transits from the presently processed line to the next horizontal line, the trigger TG2 is generated. Thus, in a process carried out at the next step S10, a sub-segment value HDIV_CNT is defined as a value indicating which one of the image sub-segments Pdiv_0 to Pdiv_7 is the image sub-segment including the presently processed line. Then, in a process carried out at the next step S11, the sub-segment value HDIV_CNT is incremented by 1 every time the trigger TG2 is generated. As a result, the sub-segment value HDIV_CNT has a value in the range 0 to 7 as a value indicating which one of the image sub-segments Pdiv_0 to Pdiv_7 is the image sub-segment including the presently processed line. That is to say, the sub-segment value HDIV_CNT represents the rate of progress of the horizontal processing. In the process carried out at the step S6, the horizontal correction velocity component stb_x is determined by referring to the sub-segment value HDIV_CNT.

It is to be noted that, in this example, a sub-segment value HDIV_CNT equal to 8 indicates that processing for image data of one frame has been completed. In addition, if the sub-segment value HDIV_CNT equal to 8 is incremented by 1, the sub-segment value HDIV_CNT is reset back to 0.

The sub-segment value HDIV_CNT is supplied to the vertical processing block 52 and the register block 53 in order to inform the vertical processing block 52 and the register block 53 of which one of the image sub-segments Pdiv_0 to Pdiv_7 is the image sub-segment including the presently processed line being processed by the horizontal processing block 51. That is to say, the sub-segment value HDIV_CNT is supplied to the vertical processing block 52 and the register block 53 in order to notify the vertical processing block 52 and the register block 53 of the rate of progress of the horizontal processing.

<Processes Carried Out by the Horizontal Image-Processing Section 512>

Figure 14:
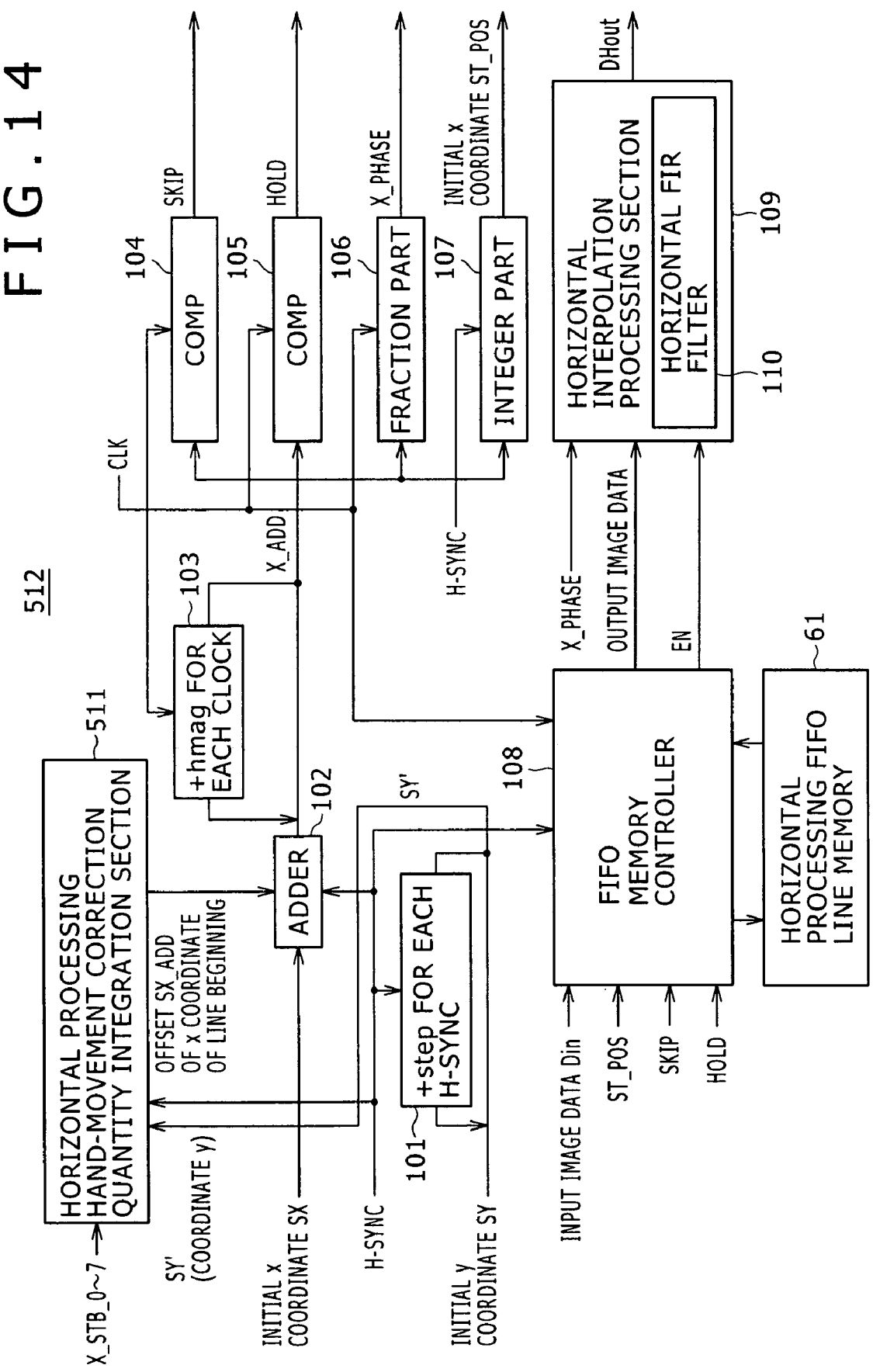
FIG. 14 is a block diagram showing a typical detailed configuration of a horizontal image-processing section employed in the embodiment shown in FIG. 4.

FIG. 14 is a diagram showing a typical configuration of the horizontal image-processing section 512. In the typical configuration shown in FIG. 14, an adder 101 for cumulatively adding the value 'step' to the initial y coordinate SY every horizontal synchronization signal H-SYNC in a process carried out at the step S1 of the flowchart described earlier by referring to FIG. 13 is included in this horizontal image-processing section 512 receiving the initial y coordinate SY from the control section 9. In addition, the horizontal image-processing section 512 also receives an initial x coordinate SX from the control section 9. As described earlier, the initial y coordinate SY and the initial x coordinate SX complete an inter-frame hand-movement process and are set at the start point of a frame in typically the control section 9 as pieces of information to be supplied to the horizontal image-processing section 512.

Then, the adder 101 supplies a y coordinate SY' obtained as a result of cumulatively adding the value 'step' to the initial y coordinate SY every horizontal synchronization signal H-SYNC to a horizontal processing hand-movement correction quantity integration section 511. In return for the y coordinate SY', the horizontal processing hand-movement correction quantity integration section 511 outputs a horizontal hand-movement correction quantity SX_ADD as an offset of the x coordinate of the start point of the presently processed line.

In an adder 102 also included in the horizontal image-processing section 512 is a unit for adding the horizontal hand-movement correction quantity SX_ADD received from the horizontal processing hand-movement correction quantity integration section 511 to the initial x coordinate SX only once at the start point of every horizontal line.

Then, an adder 103 adds a horizontal enlargement/shrinking parameter hmag to the output of the adder 102 every pixel processing clock CLK. An output X_ADD produced by the adder 103 is supplied to a comparison section 104, a comparison section 105, a fraction extraction section 106 and an integer extraction section 107.

The comparison section 104 is a unit for comparing the present output X_ADD produced by the adder 103 with the integer part of an output X_ADD preceding the present output X_ADD by one pixel processing clock CLK. If the difference between the present output X_ADD and the integer part of an output X_ADD preceding the present output X_ADD is equal to or greater than 1, that is, if the pixel position has jumped by at least 1 pixel, the comparison section 104 generates a signal SKIP indicating this jump. In this example, by referring to the signal SKIP indicating a jump, it is possible to know the skipped pixel position to be processed next with a timing indicated by a pixel processing clock CLK. The signal SKIP is supplied to a FIFO memory controller 108.

The comparison section 105 is a unit for comparing the present output X ADD produced by the adder 103 with the integer part of an output X_ADD preceding the present output X_ADD by one pixel processing clock CLK. If the difference between the present output X_ADD and the integer part of an output X_ADD preceding the present output X_ADD is smaller than 1, the comparison section 105 generates a signal HOLD for indicating the fact that the difference between the present output X_ADD and the integer part of an output X_ADD preceding the present output X_ADD is smaller than 1. That is to say, the signal HOLD indicates that the read pixel is the same pixel read earlier in an operation preceding the present read operation by one pixel processing clock CLK. The signal HOLD is also supplied to the FIFO memory controller 108.

The fraction extraction section 106 is a unit for extracting the fraction part of the output X_ADD produced by the adder 103 every pixel processing clock CLK to produce a value X_PHASE of the extracted fraction part. The value X_PHASE of the extracted fraction part is supplied to a horizontal interpolation processing section 109, which includes a horizontal FIR filter 110. The horizontal interpolation processing section 109 searches a table of multiplication coefficients on the basis of the value X_PHASE of the extracted fraction part for multiplication coefficients to be supplied to the horizontal FIR filter 110.

The integer extraction section 107 is a unit for extracting the integer part of the output X_ADD produced by the adder 103 at the start point of every horizontal line by using the horizontal synchronization signal H-SYNC to generate a value ST_POS of the extracted integer part. The integer extraction section 107 supplies the value ST_POS of the extracted integer part to the FIFO memory controller 108.

By using the horizontal-processing FIFO line memory 61, the FIFO memory controller 108 carries out a horizontal hand-movement correction process, which is based on the horizontal hand-movement correction quantity SX_ADD, on the input image data Din. The FIFO memory controller 108 also carries out a horizontal enlargement/shrinking process. The horizontal-processing FIFO line memory 61 is required to actually have a size for accommodating data of one horizontal line only when support of the process to partially enlarge an image is taken into consideration as will be described later.

To be more specific, by using the value ST_POS of the extracted integer part, the FIFO memory controller 108 determines an initial x coordinate of pixel data read out as output image data of every horizontal line for the input image data Din. In addition, the FIFO memory controller 108 refers to the signals SKIP and HOLD every pixel processing clock CLK in order to determine pixel data to be read out from the horizontal-processing FIFO line memory 61.

Then, the FIFO memory controller 108 supplies the pixel data read out as described above as output image data of every horizontal line to the horizontal interpolation processing section 109 along with a data enable signal EN.

The horizontal interpolation processing section 109 treats image data, which is received when the data enable signal EN is in an active state, as valid data and carries out an interpolation process in the horizontal direction by using the horizontal FIR filter 110. As described above, the horizontal interpolation processing section 109 searches a table of multiplication coefficients on the basis of the value X_PHASE of the extracted fraction part for multiplication coefficients and supplies the multiplication coefficients to the horizontal FIR filter 110.

As a result, the horizontal interpolation processing section 109 outputs image data DHout, which has completed the process to correct distortions caused by a hand movement in accordance with the horizontal hand-movement correction quantity SX_ADD and the enlargement/shrinking process in the horizontal direction. The horizontal interpolation processing section 109 supplies the image data DHout to the vertical processing block 52.

By the way, the above descriptions do not specially mention a relation between processing timings of the integration process carried out by the horizontal processing hand-movement correction quantity integration section 511 to produce the horizontal hand-movement correction quantity SX_ADD and the horizontal enlargement/shrinking process carried out by the horizontal processing hand-movement correction quantity integration section 511. A simple processing sequence beginning with the integration process to produce the horizontal hand-movement correction quantity SX_ADD to be followed by the horizontal enlargement/shrinking process without a time delay does not raise a problem only when a horizontal-direction partial cutting-out operation and a horizontal-direction partial enlargement operation are not supported as shown in FIG. 15A. In FIGS. 15A and 15B, notation V-SYNC denotes the vertical synchronization signal and notation ST_TG denotes the start point of a valid scanning line. In addition, segments each indicated by a horizontal dark box in FIGS. 15A and 15B are each a processing segment.

If the horizontal-direction partial cutting-out operation or the horizontal-direction partial enlargement operation is supported, on the other hand, the initial y coordinate SY has a very large value. It is thus quite within the bounds of possibility that a very large number of cycles is required in the integration process carried out at the start point of a frame. In this case, the cycles are pixel-processing cycles. A period tm of the sequence shown in FIG. 15B is the integration period.

As such, in the sequence shown in FIG. 15A, an initial enlargement/shrinking process is not completed in one periodical duration of the horizontal synchronization signal H-SYNC. It is thus necessary to provide a line memory for holding image data of the second horizontal line signaled by the arrival of the next pulse ST_TG of the horizontal synchronization signal H-SYNC.

In order to solve the problem described above, as shown by a sequence shown in FIG. 15B, an integration process is activated at a pulse ST_TG preceding a pulse ST_TG, which is used for starting a horizontal enlargement/shrinking process, by one horizontal period. In this way, timing and a sequence are adopted to always carry out an integration process with a timing preceding of the image processing by one horizontal period. Thus, in this embodiment, the horizontal-processing FIFO line memory 61 having a size for accommodating data for one horizontal line is employed.

The problem described above can be avoided by adoption of an architecture in which horizontal processing is always carried out on all input lines without regard to processes such as processing to partially enlarge an image. Anyhow, if the sequence shown in FIG. 15A is to be implemented, it is necessary to newly provide a termination signal indicating the end of an integration process and activate image processing upon receipt of the termination signal. In consequence, the configuration becomes a little bit complex. In other words, the method adopted in the embodiment described above offers a merit that it is not necessary to add new means to the existing image-processing circuit.

It is to be noted that the method adopted in the embodiment described above cannot be implemented if the vertical size of the absolute coordinate system is greater than the number of pixel-processing cycles in one periodical duration of the horizontal synchronization signal H-SYNC. In this case, it is necessary to adopt the aforementioned architecture in which horizontal processing is always carried out on all input lines.

<Processes Carried Out by the Vertical Processing Block 52>

<Integration Processing to Compute the Vertical Hand-Movement Correction Quantity SY_ADD>

Figure 16:
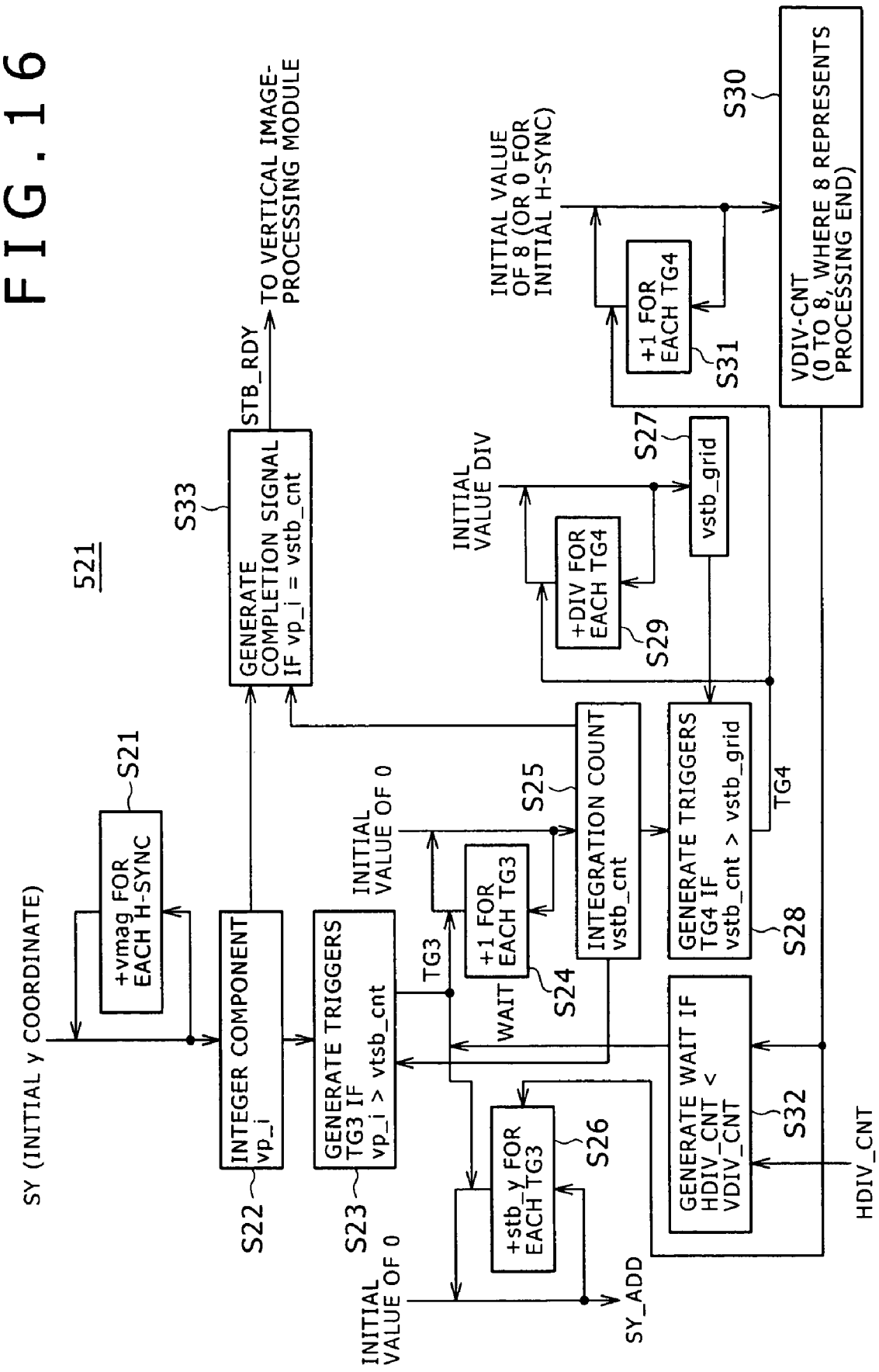
FIG. 16 shows a flowchart referred to in explaining flows of operations carried out by a vertical hand-movement correction quantity integration section employed in the embodiment shown in FIG. 4 as an embodiment implementing an apparatus for correcting distortions of a taken image.

The following description explains an integration process carried out by the vertical processing hand-movement correction quantity integration section 521 to compute the vertical hand-movement correction quantity SY_ADD. FIG. 16 shows a flowchart representing the integration process carried out by the vertical processing hand-movement correction quantity integration section 521 to compute the vertical hand-movement correction quantity SY_ADD.

The integration process to compute the vertical hand-movement correction quantity SY_ADD is similar to the integration process to compute the horizontal hand-movement correction quantity SX_ADD as described earlier by referring to the flowchart shown in FIG. 13. However, they are different from each other at the following three points.

In the case of the integration process to compute the vertical hand-movement correction quantity SY_ADD, the process is carried out differently from the horizontal hand-movement correction quantity SX_ADD as follows. In the first place, a value to be cumulatively added to the initial y coordinate SY every horizontal synchronization signal H-SYNC is vmag. In the second place, WAIT is used by consideration of the sub-segment value HDIV_CNT indicating the rate of progress of the horizontal processing. In the third place, an integration-end signal STB_RDY indicating the end of an integration process of every horizontal line is generated and propagated to a vertical signal-processing module.

In this embodiment, a vertical-direction enlargement/shrinking process in the vertical image processing is assumed. The value vmag is a magnification parameter of the vertical-direction enlargement/shrinking process. Thus, the vertical processing block 52 processes not all image data output by the horizontal processing block 51. Instead, the vertical processing block 52 carries out processing by using line vertical coordinates, which are output after the vertical-direction enlargement/shrinking process, as a reference.

For the reason described above, it is necessary to output an integration value at a coordinate serving as an object of the vertical image processing following a vertical-direction integration process. Thus, a vertical-direction coordinate increment parameter is added cumulatively every horizontal synchronization signal H-SYNC. It is to be noted that, if only distortions caused by a hand movement are merely corrected without enlarging and shrinking the image, the value of vmage can be set at 1.

As described above, the second difference of the integration process to compute the vertical hand-movement correction quantity SY_ADD from the integration process to compute the horizontal hand-movement correction quantity SX_ADD is the necessity to observe the rate of progress of the horizontal processing by referring to the sub-segment value HDIV_CNT. The rate of progress of the horizontal processing needs to be observed by referring to the sub-segment value HDIV_CNT because the vertical processing must not precede the horizontal processing. In a process to enlarge or shrink an ordinary image in the vertical direction, vertical processing preceding the horizontal processing is a process carried out on an image, which has not been generated yet. It is thus necessary to provide a mechanism for spontaneously applying WAIT mentioned above. By the same token, it is also necessary to provide a mechanism for preventing the vertical-direction integration process from preceding the horizontal processing even though the vertical-direction integration process does not handle an image directly.

What is described above is explained in more detail as follows. The horizontal correction velocity component X_STB_* serving as a horizontal-direction integration parameter has a magnitude equal to that of the horizontal component of a hand-movement speed vector in the vicinity of a sampling time of a horizontal line being processed but a sign opposite to the sign of the horizontal component of the hand-movement speed vector, which is a quantity having a magnitude and a direction. Strictly speaking, the sampling time is the middle point of an exposure period as already described earlier. In this case and the following description, notation * denotes an integer in the range 0 to 7. That is to say, the horizontal correction velocity component X_STB_* represents any of the horizontal correction velocity components X_STB_0 to X_STB_7.

By the same token, the vertical correction velocity component Y_STB_* serving as a vertical-direction integration parameter has a magnitude equal to that of the vertical component of a hand-movement speed vector in the vicinity of a sampling time of a vertical line being processed but a sign opposite to the sign of the vertical component of the hand-movement speed vector, which is a quantity having a magnitude and a direction. Strictly speaking, the sampling time is the middle point of an exposure period as already described earlier. In this case and the following description, notation * denotes an integer in the range 0 to 7. That is to say, the vertical correction velocity component Y_STB_* represents any of the vertical correction velocity components Y_STB_0 to Y_STB_7.

Thus, if the case of an extremely short exposure duration is taken into consideration, it may be impossible to confirm the horizontal correction velocity component X_STB_* and the vertical correction velocity component Y_STB_* immediately before image data of the horizontal line being processed is received in some cases.

Taking this condition into consideration, a register block 53 to be described later refers to the sub-segment value HDIV_CNT implying an image sub-segment containing a horizontal line being processed in a horizontal-direction integration process to latch the horizontal correction velocity component X_STB_* and the vertical correction velocity component Y_STB_* in a register for a horizontal processing block and a register for a vertical processing block respectively. Thus, the horizontal processing block 51 merely needs to process input images sequentially without requiring a special mechanism.

In an integration process carried out by the vertical processing block 52, on the other hand, a result of the integration process is used as an initial offset coordinate of vertical-direction image processing carried out at a later stage. Thus, at a point of time the fact that an image from the horizontal processing has not been received is known, the integration process carried out on the horizontal line has been completed. That is to say, the integration process has been carried out by using an unconfirmed vertical correction velocity component.

Thus, at the integration-process step, from the rate of progress of the horizontal processing, it is necessary to determine that the vertical correction velocity component Y_STB_* serving as a vertical-direction integration parameter for a horizontal line to be processed has not been confirmed.

In a mechanism provided for what has been described above, as shown in FIG. 16, if the sub-segment value VDIV_CNT representing the rate of progress of the vertical process exceeds the sub-segment value HDIV_CNT representing the rate of progress of the horizontal process, WAIT is generated to prevent the vertical correction velocity component stb_y for an image sub-segment including the presently processed line in a vertical process from being cumulatively added to the vertical hand-movement correction quantity SY_ADD in a state where the vertical correction velocity component Y_STB_* has been selected with the vertical correction velocity component stb_y unconfirmed as it is as shown in the lower portion of FIG. 16.

As described above, the third difference between the vertical-direction integration process shown in FIG. 16 and the horizontal-direction integration process shown in FIG. 13 is that, in the case of the vertical-direction integration process shown in FIG. 16, an integration-end signal STB_RDY indicating the end of an integration process of every horizontal line is generated for the following purpose. As a result of carrying out an integration process repeatedly with respect to every horizontal line, the integer part vp_i of the absolute coordinate of the horizontal line becomes equal to the a cumulative integration count vstb_cnt in the frame. At that time, the vertical offset SY_ADD to be passed to a vertical image-processing module provided at a later stage is found and, at the same time, vertical image processing at the later stage is activated.

If the horizontal-direction integration process already explained earlier is started with a timing preceding a timing to input a valid image by one horizontal synchronization signal H-SYNC (or one horizontal period), it is possible to assure that the horizontal-direction integration process can be completed before the horizontal image processing for the valid image is started for most cases of the system even if not for all cases. This is because it is quite within the bounds of possibility that WAIT mentioned earlier is generated in a vertical-direction integration process so that it is impossible to assure that the horizontal-direction integration process can be completed in one immediately preceding horizontal synchronization period for all cases. That is to say, an integration end signal STB_RDY indicating the completion of a vertical-direction integration process is generated with WAIT generated to carry out vertical image processing including a vertical hand-movement correction process and a vertical enlargement/shrinking process.

By referring to the flowchart shown in FIG. 16, the following description explains a vertical-direction integration process employing a vertical-direction integration circuit having the functions described above.

First of all, in a process carried out at a step S21, the value vmag described earlier is cumulatively added to the initial y coordinate SY corresponding to the position of a horizontal line every horizontal synchronization signal H-SYNC. The initial y coordinate SY has been set in an inter-frame correction process carried out by the control section 9.

By cumulatively adding the value vmag described earlier to the initial y coordinate SY every horizontal synchronization signal H-SYNC in the process carried out at a step S21, the absolute coordinate of a horizontal line being processed at the present time can be found. Then, in a process carried out at the next step S22, the integer part vp_i of the absolute coordinate is extracted as the number of times an integration process should have been carried out on the vertical correction velocity component Y_STB_* up to the present time. In this case, notation * denotes an integer in the range 0 to 7. That is to say, the vertical correction velocity component Y_STB_* represents any of the vertical correction velocity components Y_STB_0 to Y_STB_7. The number of times an integration process should have been carried out is referred to as an integration count or an integration value in a screen.

Then, in a process carried out at the next step S23, the integer part vp_i of the absolute coordinate of the horizontal line being processed is compared with an integration count vstb_cnt for up to a horizontal line immediately preceding the horizontal line being processed. As described above, the horizontal line being processed is referred to hereafter as a presently processed line. The integration count vstb_cnt for up to a horizontal line immediately preceding the presently processed line is the number of times the integration process has been carried out on horizontal lines up to the horizontal line immediately preceding the presently processed line. The difference between the integer part vp_i of the absolute coordinate of the presently processed line and the integration count vstb_cnt indicates how many times the integration process is to be carried out on the presently processed line. Thus, in the process carried out at the step S3, a trigger TG3 is generated every processing unit cycle as many times as the difference between the integer part vp_i of the absolute coordinate of the presently processed line and the integration count vstb_cnt. The processing unit cycle is much shorter than one horizontal period.

Then, in a process carried out at the next steps S24 and S25, each time the trigger TG3 is generated, the integration count vstb_cnt is incremented by 1.

Subsequently, in a process carried out at the next step S26, a vertical correction velocity component Y_STB_* selected from the vertical correction velocity components Y_STB_0 to Y_STB_7 as a vertical correction velocity component for an image sub-segment including the presently processed line is integrated every trigger TG3 in an integration process to produce a vertical hand-movement correction quantity SY_ADD. Notation stb_y shown in a block S26 of the flowchart shown in FIG. 16 denotes the vertical correction velocity component Y_STB_* selected from the vertical correction velocity components Y_STB_0 to Y_STB_7. That is to say, stb_y is the magnitude of a vertical correction velocity component for an image sub-segment including the presently processed line.

If the value vmag added cumulatively to the initial y coordinate SY every horizontal synchronization signal H-SYNC in a process carried out at the step S21 is equal to 1 and a normal output process other than, for example, a process to enlarge the image is carried out, the trigger TG3 is generated every horizontal synchronization signal H-SYNC. Thus, in the process carried out at the step S26, stb_y is cumulatively added (or integrated) each horizontal line.

The vertical hand-movement correction quantity SY_ADD obtained as a result of such an integration process is a correction quantity used for correcting a read start position of every horizontal line on the CMOS imager as described above. That is to say, the vertical hand-movement correction quantity SY_ADD obtained as a result of such an integration process is no other than the vertical position of every horizontal line in a process carried out by the vertical processing block 52 to correct image distortions generated in the vertical direction. The vertical position of every horizontal line is also referred to as a vertical offset.

As described above, in the process carried out at the step S26, a vertical correction velocity component Y_STB_* must be selected from the vertical correction velocity components Y_STB_0 to Y_STB_7 as a vertical correction velocity component for an image sub-segment including the presently processed line. The image sub-segment is a result of dividing one screen by 8 in the vertical direction. The divided screen is also referred to as one frame corresponding to one vertical synchronization period.

In this example, a cumulative value vstb_grid of the line count, which is the number of horizontal lines in image sub-segments, is defined in a process carried out at a step S27. The initial value of the cumulative value vstb_grid is DIV, which is the number of horizontal lines in any one of the image sub-segments.

Then, in a process carried out at the next step S28, the cumulative value vstb_grid is compared with the integration count vstb_cnt and a trigger TG4 is generated every time the integration count vstb_cnt exceeds the cumulative value vstb_grid. Subsequently, in a process carried out at the next step S29, DIV representing the number of horizontal lines in any one of the image sub-segments is added cumulatively to the cumulative value vstb_grid every time the trigger TG4 is generated.

By carrying out the processes described above, each time the processing transits from the presently processed line to the next horizontal line, the trigger TG4 is generated. Thus, in a process carried out at the next step S30, a sub-segment value VDIV_CNT is defined as a value indicating which one of the image sub-segments Pdiv_0 to Pdiv_7 is the image sub-segment including the presently processed line. Then, in a process carried out at the next step S31, the sub-segment value VDIV_CNT is incremented by 1 every time the trigger TG4 is generated. As a result, the sub-segment value VDIV_CNT has a value in the range 0 to 7 as a value indicating which one of the image sub-segments Pdiv_0 to Pdiv_7 is the image sub-segment including the presently processed line. That is to say, the sub-segment value VDIV_CNT represents the rate of progress of the vertical processing.

It is to be noted that, in this example, a sub-segment value VDIV_CNT equal to 8 indicates that processing for image data of one frame has been completed. In addition, if the sub-segment value VDIV_CNT equal to 8 is incremented by 1, the sub-segment value VDIV_CNT is reset back to 0.

In a process carried out at a step S32, the sub-segment value VDIV_CNT is compared with the sub-segment value HDIV_CNT received from the horizontal processing block 51 as a value representing the rate of progress of the horizontal processing. A sub-segment value VDIV_CNT found greater than the sub-segment value HDIV_CNT indicates a state in which the vertical processing leads ahead of the horizontal processing. In this case, WAIT is generated to set a state of waiting for a trigger TG3 to be generated. That is to say, a time delay is set as a delay of generation of a trigger TG3 till removal of WAIT.

In addition, in this embodiment, the integer part vp_i obtained in the process carried out at the step S22 as the integer part of the y coordinate is compared with the integration count vstb_cnt to produce a result of determination whether or not the former is equal to the latter. If the integer part vp_i of the y coordinate is found equal to the integration count vstb_cnt, an integration end signal STB_RDY indicating the end of the vertical-direction integration process carried out for the presently processed line is generated and output in a process carried out at a step S33. The integration end signal STB_RDY is supplied to the vertical image-processing section 522. The integration end signal STB_RDY informs the vertical image-processing section 522 that a vertical-direction hand correction process for the presently processed line may be started. Accordingly, vertical image processing is started with the timing indicated by the next horizontal synchronization signal H-SYNC.

<Processing of the Vertical Image-Processing Section 522>

Figure 17:
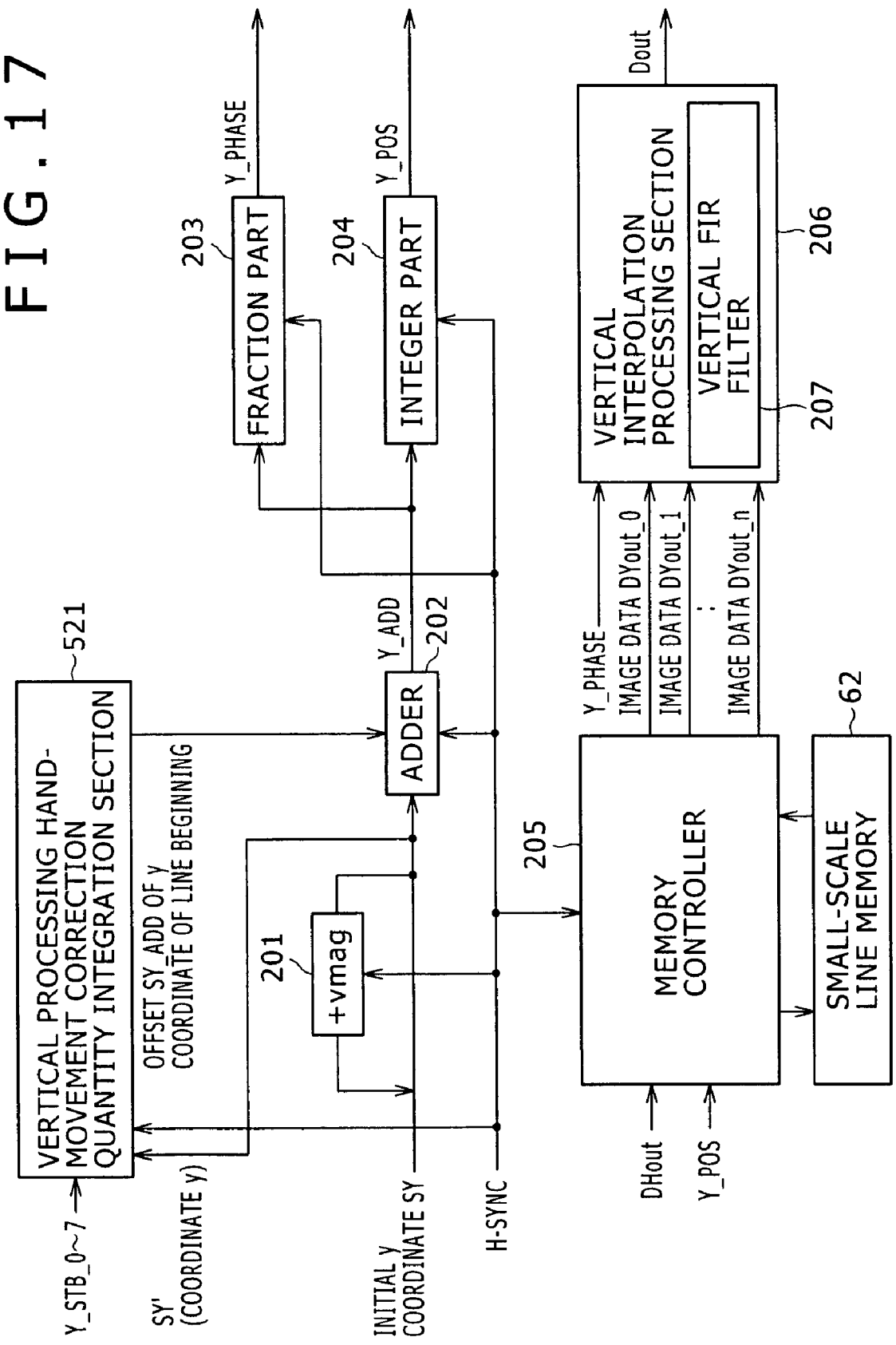
FIG. 17 is a block diagram showing a typical detailed configuration of the vertical hand-movement correction quantity integration section employed in the embodiment shown in FIG. 4 as an embodiment implementing an apparatus for correcting distortions of a taken image.
Figure 21A:
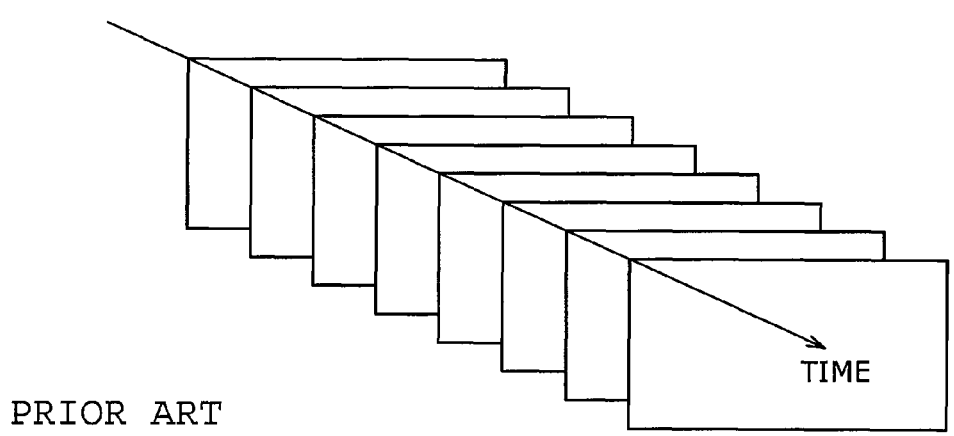
FIGS. 21A and 21B are explanatory diagrams referred to in describing the conventional inter-frame hand movement.
Figure 21B:
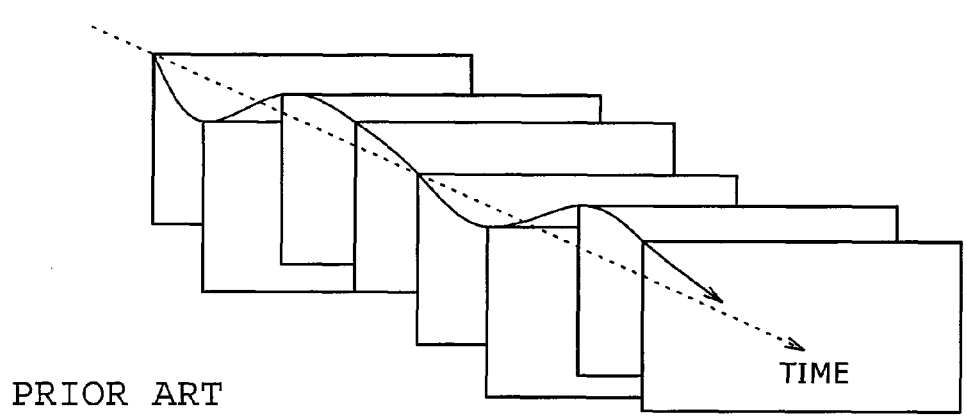

FIG. 17 is a diagram showing a typical configuration of the vertical image-processing section 522. In the typical configuration shown in FIG. 17, the vertical image-processing section 522 includes an adder 201 for cumulatively adding the value vmag every horizontal synchronization signal H-SYNC to an initial y coordinate SY, which is supplied to the vertical image-processing section 522, in a process carried out at the step S21 of the flowchart shown in FIG. 16.

The adder 201 supplies a y coordinate SY', which is obtained as a result of cumulatively adding the value vmag every horizontal synchronization signal H-SYNC to the initial y coordinate SY, to the vertical processing hand-movement correction quantity integration section 521. In return for the y coordinate SY', the vertical processing hand-movement correction quantity integration section 521 outputs a vertical hand-movement correction quantity SY_ADD as an offset of the y coordinate of the start point of the presently processed line.

In an adder 202 also included in the vertical image-processing section 522 is a unit for adding the vertical hand-movement correction quantity SY_ADD received from the vertical processing hand-movement correction quantity integration section 521 to the initial y coordinate SY only once at the start point of every horizontal line. The adder 202 supplies its output value X_ADD to a fraction extraction section 203 and an integer extraction section 204.

The fraction extraction section 203 is a unit for extracting the fraction part of a value Y_ADD generated by the adder 202 at a horizontal-line start point indicated by the horizontal synchronization signal H-SYNC in order to output a value Y_PHASE of the extracted fraction part. The value X_PHASE of the extracted fraction part is supplied to a vertical interpolation processing section 206, which includes a vertical FIR filter 207.

The vertical FIR filter 207 is a unit for carrying out an interpolation process based on pixel data of a plurality of horizontal lines laid out in the vertical direction. The vertical interpolation processing section 206 searches a table of multiplication coefficients on the basis of the value Y_PHASE of the extracted fraction part for multiplication coefficients, and supplies the multiplication coefficients found in the search process to the vertical FIR filter 207. This interpolation process is all but the same as the horizontal-direction interpolation process explained earlier by referring to FIGS. 10 to 12 except that the interpolation direction of the interpolation process carried out by the vertical FIR filter 207 is vertical.

The integer extraction section 204 is a unit for extracting the integer part of a value Y_ADD generated by the adder 202 at a horizontal-line start point indicated by the horizontal synchronization signal H-SYNC in order to output a value Y_POS of the extracted integer part. The value Y_POS of the extracted fraction part is supplied to a memory controller 205 as the y coordinate of the presently processed line.

By using the vertical-processing small-scale line memory 62, the memory controller 205 carries out a vertical hand-movement correction process, which is based on the vertical hand-movement correction quantity SY_ADD, on the output image data Dhout received from the horizontal processing block 51. The memory controller 205 also carries out a vertical enlargement/shrinking process. The vertical-processing small-scale line memory 62 has a capacity corresponding to at least the number of horizontal lines used in the interpolation process carried out by the vertical FIR filter 207. That is to say, the vertical-processing small-scale line memory 62 has a capacity corresponding to at least the number of taps of the vertical FIR filter 207.

The memory controller 205 temporarily stores the image data DHout received from the horizontal processing block 51 in the vertical-processing small-scale line memory 62 and uses the value Y_POS of the extracted integer part to determine pieces of data for a plurality of outputting horizontal lines as pieces of output image data DYout_0, DYout_1, . . . and DYout_n. Then, the memory controller 205 reads out the pieces of output image data DYout_0, DYout_1, . . . and DYout_n, which are determined in this way as the pieces of data for a plurality of horizontal lines, from the vertical-processing small-scale line memory 62 and supplies the pieces of output image data DYout_0, DYout_1 . . . and DYout_n to the vertical interpolation processing section 206.

The vertical interpolation processing section 206 is a unit for carrying out a vertical-direction interpolation process on the pieces of output image data DYout_0, DYout_1, . . . and DYout_n, which have been received from the memory controller 205, by using the vertical FIR filter 207. As described above, the multiplication coefficients to be supplied to the vertical FIR filter 207 are determined by using the value Y_PHASE received from the vertical interpolation processing section 206 as the value Y_PHASE of the extracted fraction part.

In this way, the vertical interpolation processing section 206 outputs image data Dout, which has completed the process to correct distortions caused by a hand movement in accordance with the vertical hand-movement correction quantity SY_ADD and the enlargement/shrinking process in the vertical direction.

FIG. 18 is a diagram showing relations between timings of the vertical-direction integration process explained earlier and the vertical image processing carried out at a later stage. If both a vertical-direction partial cutting-out operation and a vertical-direction partial enlargement/shrinking operation are not supported as shown in FIG. 18A, WAIT mentioned earlier is not generated. In this case, the upper limit of the vertical-direction integration count for the presently processed line is not greater than a small value. Accordingly, both the integration process and image processing to be carried out on the same line can be put on a sequence within the same period of the horizontal synchronization signal H-SYNC. In this case, it is thus unnecessary to deliberately introduce the integration end signal STB_RDY indicating the end of an integration process.

If a vertical-direction partial cutting-out operation or a vertical-direction partial enlargement operation is supported as shown in FIG. 18B, on the other hand, it is quite within the bounds of possibility that WAIT is generated in the course of an integration process carried out on the first horizontal line. In addition, if a vertical-direction partial shrinking operation is supported, WAIT is generated in any of horizontal lines in the course of an integration process.

In either case, an integration process carried out on any horizontal line is suspended by WAIT for a suspension period at least equal to some periods of the horizontal synchronization signal H-SYNC. It is thus necessary to generate an integration end signal STB-RDY at the end of the integration process at a later stage as a signal indicating the end of the process. Then, as shown by the bottom two rows of the diagram 18B, a vertical-direction enlargement/shrinking process is started with a timing indicated by a horizontal synchronization signal H-SYNC after an integration end signal STB-RDY is generated as an end signal following the end of a WAIT period.

In addition, a horizontal synchronization signal H-SYNC, which should naturally be generated but cannot be generated because vertical image processing carried out on a horizontal line has not been completed yet, is masked as indicated by a dashed line in FIG. 18B. That is to say, a horizontal synchronization signal H-SYNC, which should naturally be generated but would be generated in the course of a WAIT period, is masked.

The flows of the processing described above as processing carried out by the signal-processing section 5 including the horizontal processing block 51 and the vertical processing block 52 can be illustrated as arrows shown in FIG. 19. As shown in the figure, image data Din from the data conversion section 3 is temporarily stored in the horizontal-processing FIFO line memory 61 and then read out to be subjected to a horizontal hand-movement correction process and a horizontal enlargement/shrinking process in the horizontal image-processing section 512 and the horizontal processing hand-movement correction quantity integration section 511. Then, image data obtained as a result of the processing carried out by the horizontal image-processing section 512 is stored in the vertical-processing small-scale line memory 62.

Subsequently, the image data stored in the vertical-processing small-scale line memory 62 is subjected to a vertical hand-movement correction process and a vertical enlargement/shrinking process in the vertical image-processing section 522 and the vertical processing hand-movement correction quantity integration section 521. Then, image data obtained as a result of the processing carried out by the vertical image-processing section 522 is stored back in the vertical-processing small-scale line memory 62. Finally, output image data Dout is read out from the vertical-processing small-scale line memory 62 as an output.

An output image without distortions caused by a CMOS hand movement as shown at the right lower corner of FIG. 19 is obtained as a result of the processes described above.

As described above, the vertical-processing small-scale line memory 62 is required to have a size at least corresponding to the number of taps of the vertical FIR filter 207. Practically, however, the vertical-processing small-scale line memory 62 is required to have a size large enough for accommodating a horizontal-processing result to be subjected to an enlargement process. This is because, when a vertical-direction partial enlargement process is carried out, the processing speed of the horizontal processing is higher than the processing speed of the vertical processing.

In addition, even without a partial enlargement process, if the vertical correction velocity component Y_STB_* is oriented in the upward direction, the same operations as those of a partial enlargement process are carried out. Thus, the vertical-processing small-scale line memory 62 is required to have a size determined by taking hand movements in the upward and downward directions into consideration.

It is to be noted that, in the embodiment described above, let us assume that one vertical period has a length of $1/60$ seconds. In this case, the time duration DIV of an image sub-segment Pdiv is $(1/60)/8=1/480$ seconds. Results of experiments indicate that, at a time duration DIV having a value of this order, it is possible to obtain a sufficient necessary effect of correcting distortions caused by a hand-movement as an effect of assuring a satisfactory post-correction output image by carrying out a hand-movement correction process based on detected hand-movement velocity vectors.

Next, by referring to FIG. 20, the following description explains timings to latch data into registers in the register block 53 during the horizontal and vertical processes described above.

In this embodiment, in one period of the vertical synchronization signal V-SYNC, a microcomputer interrupt is generated at each of 8 points of time, which each do not coincide with the beginning horizontal line of each of image sub-segments Pdiv_0 to Pdiv_7, but each coincide with the center point of an exposure time described earlier.

Activated by a microcomputer interrupt, the hand-movement velocity detection processing section 8 samples a hand-movement detection output with a timing determined by a sampling signal Sp. As a sampling result, a horizontal correction velocity component X_STB_* and a vertical correction velocity component Y_STB_* are generated. The horizontal correction velocity component X_STB_* and the vertical correction velocity component Y_STB_* are then stored in IF registers employed in the register block 53.

For a process to compute the values of a horizontal correction velocity component X_STB_* and a vertical correction velocity component Y_STB_* by execution of software in the control section 13, which is a microcomputer, a method of generating interrupts periodically as shown in FIG. 20 is effective. Since the microcomputer serving as the control section 13 manages exposure times of a frame being processed, the microcomputer is capable of determining which exposure time is to be used as an exposure time whose hand-movement velocity can be used as a base of reflection for computation of the horizontal correction velocity component X_STB_* and the vertical correction velocity component Y_STB_*.

For a short exposure duration, however, in some conceivable cases, there is no enough time for computation of a hand-movement correction quantity by execution of an integration process based on the velocity of a hand movement. It is convenient to be capable of observing which horizontal line is to become the last one subjected to horizontal processing of hardware with such a subtle timing. For this reason, in the embodiment, the sub-segment value HDIV_CNT indicating the rate of progress of the horizontal processing is set in a register employed in the register block 53 as a register with stored data that can be read out by a microcomputer serving as the control section 13. The capability of observing the sub-segment value HDIV_CNT is very useful in debugging of software.

In addition, in the register block 53, changes in sub-segment value HDIV_CNT are observed to generate latch pulses. Then, the corresponding horizontal correction velocity component X_STB_* and the corresponding vertical correction velocity component Y_STB_*, which have been set by the microcomputer serving as the control section 13 in the IF registers, are latched in a horizontal-processing register and a vertical-processing register respectively with a timing determined by the generated latch pulse. That is to say, the horizontal correction velocity component X_STB_* to be used in the horizontal processing block 51 is latched in the horizontal-processing register immediately before its use. At the same time, the vertical correction velocity component Y_STB_* to be used in the vertical processing block 52 is latched in the vertical-processing register.

That is to say, basically, the vertical correction velocity component Y_STB_* to be used in the vertical processing block 52 always has the value of the vertical correction velocity component Y_STB_* latched at the same time as the horizontal correction velocity component X_STB_* for the horizontal processing block 51.

However, what is described above holds true only during a period between the active state (or the high-level state) of a frame-processing activation pulse VL1 of the vertical processing block 52 and the active state (or the high-level state) of a frame-processing activation pulse VL0 of the horizontal processing block 51. In FIG. 20, this period is shown as the period of an active state (or the high-level state) of an RV latch enable signal.

This is because the time it takes to carry out the vertical processing may become longer to a period including not only the vertical synchronization signal V-SYNC of the input image, but also even the next-frame-processing activation pulse VL0 of the horizontal processing block 51 in some cases.

<Other Embodiments and Typical Modifications>

In the embodiments described above, the horizontal hand-movement correction quantity SX_ADD and the vertical hand-movement correction quantity SY_ADD are found as hand-movement correction quantities per horizontal line period by carrying out a process to integrate the horizontal correction velocity component X_STB_* and the vertical correction velocity component Y_STB_* respectively. In the integration process, the horizontal correction velocity component X_STB_* and the vertical correction velocity component Y_STB_* are merely added to their respective initial values cumulatively. It is needless to say, however, that the horizontal hand-movement correction quantity SX_ADD and the vertical hand-movement correction quantity SY_ADD can also be found by multiplication the length of horizontal-line period by the detected horizontal correction velocity component X_STB_* and the detected vertical correction velocity component Y_STB_* respectively.

In addition, in the embodiments described above, the hand-movement velocity (vector) for an image sub-segment is obtained as a result of a sampling process carried out at the center point of an exposure period as a process to sample the output of an angular-velocity sensor or a velocity calculated by integration of the output of an acceleration sensor. As an alternative, the hand-movement velocity (vector) at the center point of an exposure period can also be found as an average value of angular velocities detected throughout the entire range of the exposure period or an average value of results of integration carried out on accelerations detected throughout the entire range of the exposure period.

As another alternative, the hand-movement velocity (vector) at the center point of an exposure period can also be found as an average value of angular velocities detected throughout a partial range centered in the middle of the exposure period in place of the entire range of the exposure period, or an average value of results of integration carried out on accelerations detected throughout a partial range centered in the middle of the exposure period the exposure period in place of the entire range of the exposure period.

In addition, in the embodiments described above, in order to minimize a delay of a process to find a hand-movement correction quantity by integration of a hand-movement velocity as a delay from image data at the start point of the process to find a hand-movement correction quantity by integration of a hand-movement velocity, a hand-movement velocity vector is found at the start point of an image sub-segment Pdiv. However, the sampling point of the hand-movement velocity vector for an image sub-segment Pdiv does not have to be the start point of an image sub-segment Pdiv. That is to say, the sampling point of hand-movement velocity vector for an image sub-segment Pdiv can be any point in the image sub-segment Pdiv as long as the delay from image data at the start point of the integration process is within a range of tolerance.

As an alternative, the hand-movement velocity vector for an image sub-segment Pdiv can also be found as an average value of hand-movement velocity vectors sampled at a plurality of sampling points in the image sub-segment Pdiv or sampled at any possible intervals of the output of the sensor. This technique to find a hand-movement velocity vector for an image sub-segment Pdiv can be applied in the same way to an acceleration sensor. In this case, however, the hand-movement velocity vector for an image sub-segment Pdiv is found as an average value of results of integration carried out on accelerations detected by the acceleration sensor. In either case, the average value can be found on the basis of observations carried out over a partial range centered in the middle of an image sub-segment Pdiv as a partial range narrower than the entire range DIV in place of the entire range DIV of the image sub-segment Pdiv.

The technique of finding a hand-movement velocity vector for an image sub-segment Pdiv as an average value as described above offers a merit that the hand-movement velocity vector includes an average of dispersions in hand-movement velocity vector.

In addition, the embodiments have been explained for a case in which image distortions caused by a hand movement made by the user operating an image-taking apparatus are corrected. However, the cause of the image distortions is not limited to a hand movement made by the user. For example, the image distortions may be caused by positional displacements made by the object of photographing in the horizontal and/or vertical directions as displacements relative to the position of the image-taking device. Such positional displacements may be in turn attributed to a displacing force such as the force generated by an added vibration.

In addition, the embodiments have been explained for a case in which a CMOS imager is employed as a solid-state image-taking device of the X-Y address type. It is needless to say, however, that the solid-state image-taking device of the X-Y address type is not limited to the CMOS imager. On top of that, applications of the present invention are not limited to image-taking apparatus or cameras. The applications include for example a hand phone and a portable information terminal, which each have an image-taking device for taking images. In addition, the present invention is applicable to not only a case in which an image-taking apparatus is carried by the user, but also a case in which an external force is applied to a fixedly installed apparatus such as a personal computer and a TV telephone set, generating vibrations or the like and a case in which an image-taking device is attached to a car as a device for taking images. It is to be noted that, in the embodiments described above, the processes to compute an inter-frame hand-movement correction quantity and correct an inter-frame hand movement are carried out by a microcomputer by execution of software. The processes can of course be carried out by using hardware.

Conversely speaking, processes carried out by using hardware in the embodiments described above as the processes to compute an inter-frame hand-movement correction quantity and correct an inter-frame hand movement can of course be performed by execution of software.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for correcting distortions contained in a signal representing a taken image of a moving picture as distortions caused by a positional change, which occurs in at least one of a horizontal and a vertical direction of said taken image at a time to photograph said moving picture as a positional change of an image-taking device, said method comprising the steps of:
correcting an inter-frame, which detects an inter-frame correction quantity for said positional change of said image-taking device in a frame period of said taken image and corrects said positional change by elimination of a displacement occurring between a frame and a next frame as a displacement of said taken image on the basis of said detected inter-frame correction quantity; and
correcting an intra-frame, which computes an intra-frame correction quantity for said positional change of said image-taking device at each of a plurality of locations on one screen of said taken image and corrects a distortion caused by said positional change on said screen of said taken image as a distortion of said taken image on the basis of said computed intra-frame correction quantity, wherein said correcting said intra-frame comprises the steps of:
(a) dividing one screen segment of said taken image into a plurality of image sub-segments,
(b) detecting a rate of said positional change for each of said image sub-segments, wherein each sub-segment is arranged to include a plurality of pixels, and a first rate of a first sub-segment defined by a first hand-movement velocity vector is different than a second rate of a second sub-segment defined by a second hand-movement velocity vector,
(c) integrating said detected rate including a horizontal-direction component and a vertical-direction component for each of said image sub-segments over the period of said image sub-segment in order to find a time-integration value to be used as said intra-frame correction quantity for a member subjected to a distortion correction process as a member of said taken image,
(d) suspending said integrating of the vertical-direction component in response to a rate of progress of said integrating of the vertical-direction component being greater than a rate of progress of said integrating of the horizontal-direction component, and
(e) correcting a distortion caused by said positional change on one screen of said taken image as a distortion in said taken image using said time-integration value to correct a distortion of said taken image.

2. The method for correcting distortions contained in a signal representing a taken image in accordance with claim 1 whereby:
at said inter-frame correction step, said inter-frame correction quantity is detected by a computer through execution of software; and
at said intra-frame correction step, said intra-frame correction quantity is computed by hardware.

3. The method for correcting distortions contained in a signal representing a taken image in accordance with claim 1 wherein
said image-taking device is capable of outputting data of said taken image in pixel units and, at said intra- frame correction step:
a positional-change rate including a horizontal-direction component and a vertical-direction component for the head member of each of said image sub-segments is detected as the rate of said positional change;
in each of said image sub-segments, a horizontal displacement and a vertical displacement for a specific member subjected to a distortion correction process is found by integrating said detected rate of said positional change over a read delay period between said head member and said specific member; and taken as said infra-frame correction quantity of said specific member, said displacement is used for correcting a distortion of said taken image.

4. The method for correcting distortions contained in a signal representing a taken image in accordance with claim 1 wherein said image-taking device is capable of outputting data of said taken image in line units and, at said intra-frame correction step:

one screen segment of said taken image is divided into a plurality of image sub-segments each consisting of a plurality of lines;

as said rate of said positional change, a positional-change rate for the start line of each of said image sub-segments is detected discretely;

a time-integration value for any specific line in each of said image sub-segments is found by carrying out a time-integration process progressing along the time axis in line units over a data-outputting delay time between said start line and said specific line on a positional-change rate detected for said start line as said rate of said positional change; and said distortion of said taken image is corrected by using said found time-integration value as said intra-frame correction value of said specific line.

5. The method for correcting distortions contained in a signal representing a taken image in accordance with claim 1, wherein said inter-frame correction quantity includes an inter-frame vertical correction amount corresponding to a vertical-direction component and an inter-frame horizontal correction amount corresponding to a horizontal-direction component, and wherein correcting the intra-frame includes integrating said detected rate including integrating a horizontal-direction component and integrating a vertical-direction component.

6. The method for correcting distortions contained in a signal representing a taken image in accordance with claim 5, wherein the process to correct distortions in the vertical direction is started and carried out concurrently with the process to correct distortions in the horizontal direction.

7. A method for correcting distortions contained in a signal representing a taken image of a moving picture as distortions caused by a positional change, which occurs in at least one of a horizontal and a vertical direction of said taken image at a time to photograph said moving picture as a positional change of an image-taking device, said method comprising the steps of:

(a) dividing said positional change into a horizontal-direction component and a vertical-direction component;

(b) correcting an inter-frame, which:
  (i) detects an inter-frame horizontal correction quantity for said horizontal-direction component of said positional change of said image-taking device for each frame period of said taken image;
  (ii) detects an inter-frame vertical correction quantity for said vertical-direction component of said positional change of said image-taking device for each frame period of said taken image; and
  (iii) computes next-inter-frame taken-image head coordinates on the basis of said detected inter-frame horizontal correction quantity and said detected inter-frame vertical correction quantity;

(c) dividing one screen segment of said taken image into a plurality of image sub-segments;

(d) detecting a rate of said positional change for each of said image sub-segments, wherein each sub-segment is arranged to include a plurality of pixels, and a first rate of a first sub-segment defined by a first hand-movement velocity vector is different than a second rate of a second sub-segment defined by a second hand-movement velocity vector, wherein the rate of said positional change is divided into a horizontal-direction component and a vertical-direction component;

(e) correcting an intra-frame horizontally, which:
  (i) computes an intra-frame horizontal correction quantity for said horizontal-direction component of said positional change of said image-taking device at each of a plurality of positions on one screen of said taken image, wherein a horizontal-direction displacement for each line in each of said image sub-segments is found by carrying out a time-integration process progressing along the time axis in line units on said horizontal-direction component of said rate of said positional change and used for correcting a horizontal-direction distortion of said taken image;
  (ii) adds said computed intra-frame horizontal correction quantity to a horizontal coordinate of said head coordinates computed at said inter-frame correction step to find a horizontal correction quantity; and
  (iii) corrects a horizontal-direction distortion in a frame of said taken image by using said found horizontal correction quantity using said time-integration value to correct a distortion of said taken image; and (f) correcting an intra-frame vertically, which:
  (i) computes an intra-frame vertical correction quantity for said vertical-direction component of said positional change of said image-taking device at each of a plurality of positions on one screen of said taken image, wherein a vertical-direction displacement for each line in each of said image sub-segments is found by carrying out a time-integration process progressing along the time axis in line units on said vertical-direction component of said rate of said positional change and used for correcting a vertical-direction distortion of said taken image;
  (ii) suspends said time-integration process of the vertical-direction component in response to a rate of progress of said time-integration process of the vertical-direction component being greater than a rate of progress of said time-integration process of the horizontal-direction component;
  (ii) adds said computed intra-frame vertical correction quantity to a vertical coordinate of said head coordinates computed at said inter-frame correction step to find a vertical correction quantity; and
  (iii) corrects a vertical-direction distortion in a frame of said taken image by using said found vertical correction quantity using said time-integration value to correct a distortion of said taken image.

8. The method for correcting distortions contained in a signal representing a taken image in accordance with claim 7 whereby:

said intra-frame horizontal correction step and said intra-frame vertical correction step are executed concurrently; and said intra-frame vertical correction step is executed to carry out a vertical-direction correction process while referring to the rate of progress of said intra-frame horizontal correction step.

9. The method for correcting distortions contained in a signal representing a taken image in accordance with claim 1 or 7 wherein said positional change of said image-taking device is a change caused by a hand movement made at a photographing time.

10. An apparatus for correcting distortions contained in a signal representing a taken image of a moving picture as distortions caused by a positional change, which occurs in at least one of a horizontal and a vertical direction of said taken image at a time to photograph said moving picture as a positional change of an image-taking device, said apparatus comprising:

inter-frame correction means for detecting an inter-frame correction quantity for said positional change of said image-taking device in a frame period of said taken image and correcting said positional change by elimination of a displacement occurring between a frame and the next frame as a displacement of said taken image on the basis of said detected inter-frame correction quantity; and intra-frame correction means for computing an intra-frame correction quantity for said positional change of said image-taking device at each of a plurality of locations on one screen of said taken image and correcting a distortion caused by said positional change on said screen of said taken image as a distortion of said taken image on the basis of said computed intra-frame correction quantity, wherein said intra-frame correction means includes:
velocity detection means for detecting a rate of said positional change for each of a plurality of image sub-segments obtained as a result of dividing one screen segment of said taken image into said plurality of image sub-segments, wherein each sub-segment is arranged to include a plurality of pixels, and a first rate of a first sub-segment defined by a first hand-movement velocity vector is different than a second rate of a second sub-segment defined by a second hand-movement velocity vector, distortion correction means for computing said intra-frame correction quantity for a member subjected to a distortion correction process as a member of said taken image on the basis of said rate detected for each of said image sub-segments as said rate of said positional change in each of said image sub-segments and correcting a distortion caused by said positional change on one screen of said taken image as a distortion in said taken image, said distortion correction means further comprises:

displacement integration means for integrating said detected rate includes a horizontal-direction component and a vertical-direction component for each of said image sub-segments over the period of said image sub-segment in order to find a time-integration value to be used as said intra-frame correction quantity for a member subjected to a distortion correction process as a member of said taken image, wherein said integrating of the vertical-direction component is suspended in response to a rate of progress of said integrating of the vertical-direction component being greater than a rate of progress of said integrating of the horizontal-direction component, and distortion correction means for correcting a distortion of said taken image by using said time-integration value.

11. The apparatus for correcting distortions contained in a signal representing a taken image in accordance with claim 10 wherein:

said inter-frame correction means detects said inter-frame correction quantity by using a computer through execution of software; and said intra-frame correction means computes said intra-frame correction quantity by using hardware.

12. The apparatus for correcting distortions contained in a signal representing a taken image in accordance with claim 10 wherein said image-taking device is capable of outputting data of said taken image in pixel units, and said distortion correction means comprising:
positional-change quantity integration means, which detects a positional-change rate including a horizontal-direction component and a vertical-direction component for the head member of each of said image sub-segments as the rate of said positional change; and finds a horizontal displacement and a vertical displacement for a specific member subjected to a distortion correction process by integrating said detected rate of said positional change over a read delay period between said head member and said specific member in each of said image sub-segments; and distortion correction means for correcting a distortion of said taken image by using said rate of said positional change acquired by said positional-change quantity integration means.

13. The apparatus for correcting distortions contained in a signal representing a taken image in accordance with claim 10 wherein:

said image-taking device is capable of outputting data of said taken image in line units;

said intra-frame correction means:
divides one screen segment of said taken image into a plurality of image sub-segments each consisting of a plurality of lines;

discretely detects a positional-change rate for the start line of each of said image sub-segments as said rate of said positional change by said velocity detection means; and said distortion correction means further comprises:
displacement integration means for finding a time-integration value for any specific line in each of said image sub-segments by carrying out a time-integration process progressing along the time axis in line units over a data-outputting delay time between said start line and said specific line on a positional-change rate detected for said start line as said rate of said positional change; and distortion correction means for correcting said distortion of said taken image by using said found time-integration value as said intra-frame correction value of said specific line.

14. An apparatus for correcting distortions contained in a signal representing a taken image of a moving picture as distortions caused by a positional change, which occurs in at least one of a horizontal and a vertical direction of said taken image at a time to photograph said moving picture as a positional change of an image-taking device, wherein said positional change is divided into a horizontal-direction component and a vertical-direction component, said apparatus comprising:

(a) inter-frame correction means for:
(i) detecting an inter-frame horizontal correction quantity for said horizontal-direction component of said positional change of said image-taking device for each frame period of said taken image;
(ii) detecting an inter-frame vertical correction quantity for said vertical-direction component of said positional change of said image-taking device for each frame period of said taken image; and (iii) computing next-inter-frame taken-image head coordinates on the basis of said detected inter-frame horizontal correction quantity and said detected inter-frame vertical correction quantity;

(b) intra-frame horizontal correction means for:
(i) computing an intra-frame horizontal correction quantity for said horizontal-direction component of said positional change of said image-taking device at each of a plurality of positions on one screen of said taken image;
(ii) adding said computed intra-frame horizontal correction quantity to a horizontal coordinate of said head coordinates computed by said inter-frame correction means to find a horizontal correction quantity; and
(iii) correcting a horizontal-direction distortion in a frame of said taken image by using said found horizontal correction quantity; and (c) intra-frame vertical correction means for:
(i) computing an intra-frame vertical correction quantity for said vertical-direction component of said positional change of said image-taking device at each of a plurality of positions on one screen of said taken image;
(ii) adding said computed intra-frame vertical correction quantity to a vertical coordinate of said head coordinates computed by said inter-frame correction means to find a vertical correction quantity; and
(iii) correcting a vertical-direction distortion in a frame of said taken image by using said found vertical correction quantity; and (d) velocity detection means for detecting a rate of said positional change for each of a plurality of image sub-segments obtained as a result of dividing one screen segment of said taken image into said plurality of image sub-segments, wherein each sub-segment is arranged to include a plurality of pixels, and a first rate of a first sub-segment defined by a first hand-movement velocity vector is different than a second rate of a second sub-segment defined by a second hand-movement velocity vector, wherein said intra-frame horizontal correction means and said intra-frame vertical correction means divide the rate of said positional change into a horizontal-direction component and a vertical-direction component, wherein said intra-frame horizontal correction means finds a horizontal-direction displacement for each line in each of said image sub-segments by carrying out a time-integration process progressing along the time axis in line units on said horizontal-direction component of said rate of said positional change and uses said horizontal-direction displacement for correcting a horizontal-direction distortion of said taken image, wherein said intra-frame vertical correction means finds a vertical-direction displacement for each line in each of said image sub-segments by carrying out a time-integration process progressing along the time axis in line units on said vertical-direction component of said rate of said positional change and uses said vertical-direction displacement for correcting a vertical-direction distortion of said taken image, wherein said intra-frame vertical correction means suspends said time-integration process of the vertical-direction component in response to a rate of progress of said time-integration process of the vertical-direction component being greater than a rate of progress of said time-integration process of the horizontal-direction component.

15. The apparatus for correcting distortions contained in a signal representing a taken image in accordance with claim 14 wherein:
said intra-frame horizontal correction means and said intra-frame vertical correction means are executed concurrently; and
said intra-frame vertical correction means carries out a vertical-direction correction process while referring to information on the rate of progress from said intra-frame horizontal correction means.

16. The apparatus for correcting distortions contained in a signal representing a taken image in accordance with claim 10 or 14 wherein said positional change of said image-taking device is a change caused by a hand movement made at a photographing time.

* * * * *